United States Patent

Shimo et al.

(10) Patent No.: US 6,294,602 B1
(45) Date of Patent: Sep. 25, 2001

(54) RESIN COMPOSITION

(75) Inventors: Hiroyuki Shimo; Yasuhiko Haneda; Syuichi Kanao, all of Kurashiki (JP)

(73) Assignee: Kuraray Co., Ltd., Kurashiki (JP)

( * ) Notice: Subject to any disclaimer, the term of this patent is extended or adjusted under 35 U.S.C. 154(b) by 0 days.

(21) Appl. No.: 09/297,569

(22) PCT Filed: Mar. 9, 1998

(86) PCT No.: PCT/JP98/00947

§ 371 Date: May 4, 1999

§ 102(e) Date: May 4, 1999

(87) PCT Pub. No.: WO99/11707

PCT Pub. Date: Mar. 11, 1999

(30) Foreign Application Priority Data

Sep. 4, 1997 (JP) .................................................. 9-239890
Sep. 5, 1997 (JP) .................................................. 9-241151

(51) Int. Cl.$^7$ ............................ C08K 5/09; C08L 29/04; C08L 77/00; C08J 11/04; B32B 27/08
(52) U.S. Cl. ...................... 524/394; 524/437; 524/503; 524/514; 525/57; 525/58; 525/190; 521/40.5; 428/474.4
(58) Field of Search .................... 524/394, 437, 524/503, 514; 525/57, 58, 190; 521/40.5; 428/474.4

(56) References Cited

U.S. PATENT DOCUMENTS 3,857,754 * 12/1974 Hirata et al. .
5,160,475 11/1992 Asano et al. .
5,177,138 1/1993 Moriyama et al. .
5,214,090 5/1993 Moriyama et al. .
5,278,229 1/1994 Asano et al. .
5,280,065 1/1994 Moriyama et al. .
5,298,334 3/1994 Moriyama et al. .
5,310,788 5/1994 Moriyama et al. .
5,322,877 * 6/1994 Moriyama et al. .
6,011,115 1/2000 Miharu et al. .

FOREIGN PATENT DOCUMENTS 0 221 659   5/1987  (EP) .
0 444 977   9/1991  (EP) .
797625      6/1996  (EP) .
4-164941    6/1992  (JP) .
4-164944    6/1992  (JP) .
8-217934    8/1996  (JP) .
9-77945     3/1997  (JP) .

* cited by examiner

Primary Examiner—Tae H. Yoon
(74) Attorney, Agent, or Firm—Oblon, Spivak, McClelland, Maier & Neustadt, P.C.

(57) ABSTRACT

A resin composition comprising (A) an ethylene-vinyl alcohol copolymer, (B) a polyamide resin, (C) an ethylene-unsaturated carboxylic acid random copolymer or its metal salt, and (D) a thermoplastic resin except the resins noted above, of which the solubility parameter (as calculated from the Fedors' formula) is not more than 11. The resin composition has good compatibility, excellent barrier properties, mechanical strength, flexibility, drawability, melt stability, scrap recyclability, heat sealability, coatability, stain resistance and transparency.

21 Claims, 1 Drawing Sheet

RESIN COMPOSITION

TECHNICAL FIELD

The present invention relates to a resin composition comprising (A) an ethylene-vinyl alcohol copolymer, (B) a polyamide resin, (C) an ethylene-unsaturated carboxylic acid random copolymer or its metal salt, and (D) a thermoplastic resin except the resins noted above, of which the solubility parameter (as calculated from the Fedors' formula) is not more than 11. The resin composition has good compatibility, and has excellent barrier properties, mechanical strength, flexibility, drawability, melt stability, scrap recyclability, heat sealability, coatability, stain resistance and transparency.

BACKGROUND ARTS

As having excellent melt moldability, secondary processability, mechanical characteristics and economical efficiency, hydrophobic thermoplastic resins such as polyolefins and polystyrenes are widely used for various applications. For example, in the field of food packaging industry, they are used for producing films and containers such as bottles, cups, etc.; while in the field of non-food industry, they are used in various daily necessities, parts of electric or electronic appliances for household use, car parts, etc. Multi-layered structures comprising hydrophobic thermoplastic resin and ethylene-vinyl alcohol copolymer (hereinafter referred to as EVOH) are widely used in the field of food industry or the like that requires barrier properties to oxygen, flavors, etc.

Laminating hydrophobic thermoplastic resin and EVOH makes it possible to produce laminate structures having the characteristics of the two. Apart from this, techniques of blending the two are also widely employed in various fields.

However, EVOH is a resin having high hydrophilicity, and its compatibility with hydrophobic thermoplastic resins is poor. Therefore, combining EVOH with hydrophobic thermoplastic resin is often problematic in that resin compositions having good physical properties could not be obtained. Various types of compatibilizers for the two, such as typically polyolefinic resins having polar functional groups have heretofore been studied, but their effects are not always satisfactory. In that situation, it is desired to develop more effective compatibilizers capable of satisfactorily compatibilizing the two.

The technique of laminating hydrophobic thermoplastic resin such polyolefin or polystyrene with EVOH is useful, but is often problematic in producing complicated or small-sized laminates, since it is difficult to produce them through multi-layered lamination using the two. In that situation, it is desired to develop thermoplastic resins capable of being formed into single-layered barrier structures. Japanese Patent Application Laid-Open (JP-A) Hei-6-80150 (European Patent 584,808) discloses one example of a single-layered barrier structure, in which is used a resin composition comprising three components of polyolefin, EVOH having a melting point of not lower than 135° C. and EVOH having a melting point of 130° C. or lower, for producing the head of a two-piece tube container composed of a head and a cylindrical body. However, the head disclosed therein is not still satisfactory, as its characteristics including barrier properties, mechanical strength and adhesion strength to cylindrical bodies are not always good.

Hydrophobic thermoplastic resins such as polyolefins, polystyrenes and the like have various drawbacks owing to their hydrophobic properties. For example, when articles of those resins are painted, the adhesion strength between their surfaces and paint vehicles (that is, the coatability of their surfaces with paint vehicles) is poor since the surfaces have non-polar properties. One drawback of the resins is that the resin articles must be subjected to primer treatment prior to coating in order to improve the coatability of their surfaces, thereby resulting in that the coating costs are high. Recently, organic solvent-based paints are being replaced by aqueous paints for the protection of the environment. However, the compatibility of aqueous paints with hydrophobic thermoplastic resins is extremely low. In that situation, it is much more desired to develop thermoplastic resins with improved coatability.

On the other hand, EVOH is known to be useful in the field of food industry that requires barrier properties to oxygen, odors, flavors or the like, for example, as wrapping or packaging films for foods, etc.

At present, however, EVOH is used little by itself, as its toughness is poor. For example, one drawback of EVOH films is that they often have pin holes when repeatedly folded or deformed.

In order to overcome its poor toughness and flexibility, EVOH is often formed into multi-layered structures by laminating layers of EVOH and thermoplastic resin such as polyethylene, polypropylene, polyamide or the like, along with layers of adhesive resin. However, as so mentioned hereinabove, it is often difficult to produce complicated or small-sized, multi-layered structures of thermoplastic resin and EVOH. Therefore, EVOH is often used by itself to form single-layered structures for complicated or small-sized articles. Even if multi-layered structures composed of EVOH and thermoplastic resin layers are formed, their applications are often limited since their properties are not good because of the poor flexibility of the EVOH resin layer. Accordingly, it is desired to develop a resin composition comprising EVOH, which has good flexibility while still getting the barrier properties intrinsic to EVOH.

In order to overcome the drawbacks of EVOH, various methods have heretofore been reported for combining EVOH with ethylenic polymers having good flexibility. However, most of them are still unsatisfactory in that the flexibility and drawability of the resin compositions produced therein is still poor and that the transparency intrinsic to EVOH is greatly lowered in the resin compositions. At present, therefore, the reported methods have few practical applications in the art. In that situation, it is desired to develop a resin composition having excellent flexibility, drawability and transparency.

EVOH has excellent chemical resistance, oil resistance, stain resistance and plasticizer shieldability, and EVOH films are much used in interior finish work. For example, an EVOH film is laminated on the surface of interior material such as wallpaper, decorative plywood, polyvinyl chloride leatherette, etc. However, EVOH films have a high degree of surface gloss, and are therefore problematic in applications for wallpaper, leatherette and the like that must be matted. In those applications, EVOH films shall be matted by applying thereto matting rolls under heat and pressure. However, if sufficient pressure could not be applied thereto, EVOH films could not be well matted. Apart from the method of using matting rolls for matting films, known are (1) a sand-blasting method, (2) a surface-treating method with chemicals, and (3) a method of adding powdery inorganic substances. However, all those methods are defective in that they are expensive and their producibility to form films is poor. In particular, the method (3) of adding powdery inorganic substances is not suitable for EVOH. This is because, if a large amount of a powdery inorganic substance is added to EVOH so as to attain the intended matting result, the resulting EVOH films will have pin holes and will not able to produce films.

One method of solving this problem is disclosed in JP-A Sho-64-74252, which provides a mat film comprising from 50 to 95% by weight of EVOH and from 5 to 50% by weight of a carboxylic acid-modified polyethylene resin and in which at least one surface of the mat film provided has a degree of surface gloss of not higher than 60%. However, the blend resin composition used therein is still unsatisfactory as its thermal stability is poor.

Where multi-layered containers (bottles, cups, etc.) comprising a thermoplastic resin and an EVOH resin are produced, the process gives scrap (burs in producing bottles, blanked-off scrap in producing cups, etc.). To recycle the scrap, generally employed is a method of interposing a scrap-recycled layer between a thermoplastic resin layer and an EVOH layer of multi-layered containers. In that method, however, where the recycled mixture comprising a thermoplastic resin and an EVOH resin is melt-extruded to form the scrap-recycled layer, its flow stability is often disordered because of the poor compatibility between the EVOH resin and the thermoplastic resin and of the thermal deterioration of the EVOH resin, often resulting in that the multi-layered sheets having the scrap-recycled layer and the moldings formed from them through thermoforming will have wavy patterns on their surfaces.

In order to solve this problem, a method has been proposed of adding, as a compatibilizer, an EVOH having an ethylene content of from 68 to 98 mol % and a degree of saponification of the vinyl acetate component of at least 20%, to a mixture of an EVOH having an ethylene content of from 20 to 65 mol % and a degree of saponification of the vinyl acetate component of at least 96% and a thermoplastic resin (see JP-A Hei-3-215032, U.S. Pat. 5,094,921). However, the proposed method is not so much effective enough to completely remove the wavy patterns of the multi-layered sheets and their moldings. Therefore, it is desired to develop more powerful compatibilizers.

JP-A Hei-4-164941 discloses a polyolefinic resin composition having excellent barrier properties, which comprises from 50 to 99.5% by weight of a polyolefin, from 0.4 to 50% by weight of an EVOH, and from 0.1 to 15% by weight of a graft polymer having been prepared by grafting a polyolefin with an ethylenic unsaturated carboxylic acid or its derivative followed by melt-mixing it with apolyamide. JP-A Hei-4-164944 discloses an EVOH-based resin composition having excellent waterproofness, excellent gas barrier properties in high-humidity atmospheres, and excellent drawability and flexibility, which comprises from 0.4 to 50% by weight of a polyolefin, from 50 to 99.5% by weight of an EVOH, and from 0.1 to 15% by weight of the graft polymer noted above.

In those, however, the modified polyolefin to be melt-mixed with a polyamide is one as prepared by grafting a polyolefin with an unsaturated carboxylic acid or its derivative, and this is not a random copolymer. Being different from those techniques disclosed, the present invention uses a random copolymer. As will be demonstrated in Comparative Examples to be mentioned hereinunder, using graft copolymers could not attain the object of the present invention.

JP-A Hei-8-217934 (European Patent Laid-Open No. 797,625) discloses a thermoplastic resin composition comprising from 50 to 85 parts by weight of an EVOH, from 10 to 40 parts by weight of an ionomer of an ethylene-unsaturated carboxylic acid copolymer having an unsaturated carboxylic acid content of from 4 to 15 mol %, and from 1 to 25 parts by weight of a polyamide. They say that the composition disclosed has excellent gas barrier properties, impact resistance, pin-hole resistance, ductility, drawability and transparency. JP-A Hei-9-77945 (European Patent Laid-Open No. 797,625) discloses a resin composition as prepared by adding from 0.01 to 3 parts by weight of a metal salt of a fatty acid to 100 parts of the resin composition of JP-A Hei-8-217934. They say that the resin composition disclosed has better thermal stability.

However, as will be demonstrated in Comparative Examples to be mentioned hereinunder, the flexibility, especially the bending resistance of those resin compositions disclosed is still unsatisfactory even though they comprise an EVOH as the major component. Nothing is referred to in those prior publications relating to a technique of adding a specific hydrophobic thermoplastic resin to the resin compositions comprising the three components noted above.

Japanese Patent Publication (JP-B) Sho-51-41657 (USP 3,857,754 and 3,975,463) discloses a resin composition having excellent processability and gas barrier properties, which comprises from 30 to 98 parts by weight of a low-density polyethylene, from 2 to 70 parts by weight of an EVOH, and from 0.5 to 15 parts by weight of at least one thermoplastic polymer having a carbonyl group in its main chain or side chain and selected from ionomers and polyamides. They say that both an ionomer and a polyamide may be in the composition but are silent at all about the fact that adding the combination of the two to the composition is preferred and about the effect of the two added in combination. In addition, nothing is referred to in the publication relating to the mixing ratio of the polyamide and the ionomer to be combined.

In this connection, we, the present inventors have verified that the absence of any one of a polyamide or an ionomer could not attain the object of the present invention, as in Comparative Examples to be mentioned hereinunder.

In that background noted above, one object of the present invention is to provide a resin composition having excellent compatibility while having excellent barrier properties, mechanical strength, flexibility, drawability, melt stability, heat sealability, coatability, stain resistance and transparency. Another object of the invention is to provide a resin composition comprising a thermoplastic resin and an EVOH for multi-layered structures, of which the scrap is well recycled in producing moldings without making the moldings have wavy patterns on their surfaces.

The wording of barrier properties as referred to herein is not limited to only the concept of so-called gas barrier properties to gases such as oxygen, nitrogen, carbon dioxide and the like, but shall include any other concepts of non-adsorbability and non-perviousness to flavor components (e.g., limonene, etc.), odor components (e.g., skatole, etc.) and hydrocarbons such as gasoline, etc.

DISCLOSURE OF THE INVENTION

The objects noted above are attained by providing a resin composition comprising (A) an ethylene-vinyl alcohol copolymer, (B) a polyamide resin, (C) an ethylene-unsaturated carboxylic acid random copolymer or its metal salt, and (D) a thermoplastic resin except the resins noted above, of which the solubility parameter (as calculated from the Fedors' formula) is not more than 11, wherein;

the compositional ratio by weight satisfies the following formulae (1) to (4):

$$0.6 \leq W(A+D)/W(T) \leq 0.995 \quad (1)$$

$$0.005 \leq W(B+C)/W(T) \leq 0.4 \quad (2)$$

$$0.01 \leq W(A)/W(A+D) \leq 0.99 \quad (3)$$

$$0.02 \leq W(B)/W(B+C) \leq 0.98 \quad (4)$$

wherein;
W(A) indicates the weight of (A) in the composition,
W(B) indicates the weight of (B) in the composition,
W(C) indicates the weight of (C) in the composition,
W(D) indicates the weight of (D) in the composition,
W(T) indicates the total weight of the composition.

Preferably, the resin composition contains from 0.01 to 3 parts by weight, based on the total weight of the composition, of at least one selected from metal salts of higher aliphatic carboxylic acids andhydrotalcite compounds. Also preferably, the compositional ratio by weight of W(B)/W(B+C) in the resin composition is not more than 0.5.

In preferred embodiments of the resin composition, the thermoplastic resin (D) forms a matrix phase and the ethylene-vinyl alcohol copolymer (A) forms a dispersed phase; or the ethylene-vinyl alcohol copolymer (A) forms a matrix phase and the thermoplastic resin (D) forms a dispersed phase. In the latter case, it is preferable that the thermoplastic resin (D) has a modulus of elasticity at 20° C. of not more than 500 kg/cm$^2$.

One preferred method for producing the resin composition comprises mixing a polyamide resin (B) and an ethylene-unsaturated carboxylic acid random copolymer or its metal salt (C) both in melt followed by mixing the resulting melt mixture with an ethylene-vinyl alcohol copolymer (A) and a thermoplastic resin (D) all in melt.

Preferred embodiments of using the resin composition of the present invention include a multilayered structure comprising at least one layer of the resin composition; a head of a tube container comprising the resin composition; a shaped article comprising the resin composition, of which the surface is painted; a thermoformed container having a layer of the resin composition; a flexible film comprising the resin composition; and a mat film comprising the resin composition, of which at least one surface has a degree of surface gloss of not more than 60%.

Still another preferred embodiment of the present invention is a scrap recycling method of using (B) a polyamide resin and (C) an ethylene-unsaturated carboxylic acid random copolymer or its metal salt as the compatibilizer for recycling the scrap of shaped articles that comprise, as the major components, (A) an ethylene-vinyl alcohol copolymer and (D) a thermoplastic resin except the resins noted above, of which the solubility parameter (as calculated from the Fedors' formula) is not more than 11.

In the scrap recycling method, the compatibilizer preferably contains at least one of metal salts of higher aliphatic carboxylic acids and hydrotalcite compounds.

Still another preferred embodiment of the invention is a multilayered structure comprising at least one scrap-recycled layer of the resin composition as obtained according to the recycling method noted above.

EVOH (A) to be in the composition of the invention is obtained by saponifying an ethylene-vinyl ester copolymer, and it may have an ethylene content of from 15 to 70 mol %, but preferably from 20 to 65 mol %, most preferably from 25 to 60 mol %, and a degree of saponification of the vinyl ester moiety of at least 85%, but preferably at least 90%. If the ethylene content of EVOH is smaller than 15 mol %, the melt moldability of the composition is poor, and the water-proofness and hot water-proofness thereof is also poor. On the other hand, if the ethylene content is larger than 70 mol %, the barrier properties of the composition are poor. If the degree of saponification of EVOH is smaller than 85%, the barrier properties and the thermal stability of the composition are poor. If the ethylene content is larger than 70 mol % or if the degree of saponification is smaller than 85%, the stain resistance of the film of the composition is poor. If so, in addition, and when the film is laminated on a polyvinyl chloride layer containing a plasticizer to form wallpaper, its ability to prevent the plasticizer from bleeding out is poor.

One typical example of vinyl esters to be used for producing EVOH is vinyl acetate, but any other vinyl esters of fatty acids (e.g., vinyl propionate, vinyl pivalate, etc.) are employable herein. If desired, EVOH for use herein may be copolymerized with from 0.0002 to 0.2 mol % of a vinylsilane compound of a comonomer component. The vinylsilane compound includes, for example, vinyltrimethoxysilane, vinyltriethoxysilane, vinyltri(β-methoxyethoxy)silane, γ-methacryloxypropylmethoxysilane. Of those, preferred are vinyltrimethoxysilane and vinyltriethoxysilane. If also desired, EVOH may be further copolymerized with any other comonomers [e.g., propylene, butylene, unsaturated carboxylic acids and their esters (e.g., (meth)acrylic acid, methyl (meth)acrylate, ethyl (meth)acrylate, etc.), vinylpyrrolidone (N-vinylpyrrolidone etc.)] without detracting from the objects of the invention.

Preferably, EVOH for use in the invention has a melt index (MI, at 190° C. under a load of 2160 g) of from 0.1 to 50 g/10 min., but most preferably from 0.5 to 30 g/10 min. For EVOH having a melting point of around 190° C. or higher than 190° C., its MI is measured under a load of 2160 g at different temperatures not lower than its melting point, and the data are plotted on a semi-logarithmic graph where the horizontal axis indicates the reciprocal of the absolute temperature and the vertical axis indicates the logarithm of MI, from which is extrapolated the MI of EVOH at 190° C. Those EVOH resins may be used herein either singly or as combined.

The polyamide resin (B) for use in the invention is a polymer having amido bonds, which includes, for example, homopolymers such as polycapramide (nylon-6), polyundecanamide (nylon-11), polylauryl-lactam (nylon-12), polyhexamethylene-adipamide (nylon-6,6), polyhexamethylene-sebacamide (nylon-6,12); as well as caprolactam/lauryl-lactam copolymer (nylon-6/12), caprolactam/aminoundecanoic acid copolymer (nylon-6/11), caprolactam/ω-aminononanoic acid copolymer (nylon-6/9), caprolactam/hexamethylenediammonium adipate copolymer (nylon-6/6,6), caprolactam/hexamethylenediammonium adipate/hexamethylenediammonium sebacate copolymer (nylon-6/6,6/6,12), copolymers of adipic acid and metaxylylenediamine, aromatic nylons such as copolymers of hexamethylenediamine and m,p-phthalic acids, etc. Those polyamide resins may be used herein either singly or as combined.

Of the polyamide resins (B), preferred are those containing a nylon-6 component (e.g., nylon-6, nylon-6,12, nylon-6/12, nylon-6/6,6, etc.), in view of their compatibility with EVOH. EVOH and nylon react with each other to form a gel in the melting step. In order to prevent the thermal deterioration of the blend composition, it is desirable that the melting point of nylon for use herein is not higher than 240° C., more preferably not higher than 230° C.

Preferably, the polyamide (B) for use in the invention has a melt index (MI, at 210° C. under a load of 2160 g) of from 0.1 to 50 g/10 min., but most preferably from 0.5 to 30 g/10 min. For the polyamide (B) having a melting point of around 210° C or higher than 210° C., its MI is measured under a load of 2160 g at different temperatures not lower than its melting point, and the data are plotted on a semi-logarithmic graph where the horizontal axis indicates the reciprocal of the absolute temperature and the vertical axis indicates the logarithm of MI, from which is extrapolated the MI of the polyamide at 210° C.

The ethylene-unsaturated carboxylic acid random copolymer or its metal salt (C) for use in the invention is a copolymer as obtained through random copolymerization of ethylene and an unsaturated carboxylic acid, or its metal salt as obtained by neutralizing the carboxylic acid component of the copolymer. The latter is a so-called ionomer. For (C), it is extremely important that ethylene and an unsaturated carboxylic acid is random-copolymerized. Using a graft copolymer as obtained through graft copolymerization of ethylene and an unsaturated carboxylic acid in place of the random copolymer could not produce the effects of the invention, as is so demonstrated in Comparative Examples to be mentioned hereinunder. The reason why the random copolymer or its metal salt is preferable to the graft copolymer is not clear, but it is believed that the reason is because the compatibility of the random copolymer with the polyamide resin (B) is better than that of the graft copolymer with it. In addition, the graft copolymer is unfavorable since the carboxyl group existing therein will react with the hydroxyl group in EVOH to produce gels and fish eyes. The formation of gels and fish eyes is noticeable especially in time-consuming melt-molding. As the component (C) in the resin composition of the invention, preferred is the ionomer of a metal salt of the ethylene-unsaturated carboxylic acid random copolymer to the random copolymer itself, but the reason is not clear. However, it is believed that the reason is because the compatibility of the ionomer with nylon will be better than that of the random copolymer itself with it.

The unsaturated carboxylic acid content of the copolymer is preferably from 2 to 15 mol %, but more preferably from 3 to 12 mol %. The unsaturated carboxylic acid includes, for example, acrylic acid, methacrylic acid, ethacrylic acid, maleic acid, monomethyl maleate, monoethyl maleate, maleic anhydride, etc. Especially preferred are acrylic acid and methacrylic acid. The copolymer may contain any other comonomers. The additional comonomers include, for example, vinyl esters such as vinyl acetate, vinyl propionate; unsaturated carboxylates such as methyl acrylate, ethyl acrylate, isopropyl acrylate, isobutyl acrylate, n-butyl acrylate, 2-ethylhexyl acrylate, methyl methacrylate, isobutyl methacrylate, diethyl maleate; carbon monoxide, etc.

The metal ion that constitutes the ionomer includes, for example, alkali metals such as lithium, sodium, potassium, etc.; zinc; alkaline earth metals such as magnesium, calcium, etc. Especially preferred is zinc, as the compatibility of zinc ionomers with nylon is good. It is desirable that the degree of neutralization of the ionomer is at most 100%, but more preferably at most 90%, even more preferably at most 70%. The lowermost limit of the degree of neutralization may be generally at least 5%, but preferably at least 10%, more preferably at least 30%.

Preferably, the ethylene-unsaturated carboxylic acid random copolymer or its metal salt for use in the invention has a melt index (MI, at 190° C. under a load of 2160 g) of from 0.05 to 50 g/10 min., but most preferably from 0. 5 to 30 g/10 min. Those ethylene-unsaturated carboxylic acid random copolymers and their metal salts may be used herein either singly or as combined.

The thermoplastic resin (D) for use in the invention shall differ from the other components (A), (B) and (C), and its solubility parameter must be at most 11. Specifically, the solubility parameter (as calculated from the Fedors' formula) of the thermoplastic resin (D) is near to that of the ethylene-unsaturated carboxylic acid random copolymer or its salt (C), and therefore the compatibility of the four components (A), (B), (C) and (D) with each other is high. If, the solubility parameter of the thermoplastic resin (D) is more than 11, the compatibility of the four components (A), (B), (C) and (D) with each other is low. If so, the scrap recyclability, the thermoformability, the mechanical strength and the transparency of the blend resin composition will be greatly lowered.

The thermoplastic resin (D) having a solubility parameter of at most 11 includes, for example, polyolefinic resins, styrenic resins, polyvinyl chloride-based resins, etc. Of those, most preferred are polyolefinic resins. Examples of the polyolefinic resins include α-olefinic homopolymers such as high-density or low-density polyethylene, polypropylene, polybutene-1, etc.; copolymers of α-olefins selected from ethylene, propylene, butene-1, hexene-1, etc.; and also copolymers of such α-olefins with any other comonomers. The comonomers to be copolymerized with α-olefins include, for example, diolefins; vinyl compounds such as vinyl chloride, vinyl acetate, etc.; unsaturated carboxylic acids such as maleic acid, acrylic acid, methacrylic acid, etc.; and their anhydrides. Examples of the styrenic resins include polystyrenes, acrylonitrile-butadiene-styrene copolymer resins (ABS), acrylonitrile-styrene copolymer resins (AS), etc. Those thermoplastic resins may be used herein either singly or as combined.

Preferably, the thermoplastic resin (D) for use in the invention has a melt index (MI, at 190° C. under a load of 2160 g) of from 0.05 to 100 g/10 min., but more preferably from 0.05 to 50 g/10 min., most preferably from 0.5 to 30 g/10 min. For the resin (D) having a melting point of around 190° C. or higher than 190° C., its MI is measured under a load of 2160 g at different temperatures not lower than its melting point, and the data are plotted on a semi-logarithmic graph where the horizontal axis indicates the reciprocal of the absolute temperature and the vertical axis indicates the logarithm of MI, from which is extrapolated the MI of the resin (D) at 190°C.

The most characteristic feature of the present invention is that a combination of the two components of the polyamide (B) and the ethylene-unsaturated carboxylic acid random copolymer or its metal salt (C) is used as the compatibilizer for compatibilizing the EVOH (A) and the thermoplastic resin (D), and the combination of the polyamide (B) and the ethylene-unsaturated carboxylic acid random copolymer or its metal salt (C) significantly improves the compatibility between the EVOH (A) and the thermoplastic resin (D), thereby producing the resin composition having excellent characteristics. In other words, as the means of improving the compatibility between the EVOH (A) and the thermoplastic resin (D) which are poorly compatible with each other as greatly differing in the solubility parameter, we, the inventors have used, as a compatibilizer for both (A) and (D), the combination of the polyamide (B) and the ethylene-unsaturated carboxylic acid random copolymer or its metal salt (C), the former (B) being highly compatible with the EVOH (A) while the latter (C) being highly compatible with the thermoplastic resin (D), and have found the resin composition of the present invention.

The compositional ratio by weight of the components constituting the resin composition of the invention satisfies the following formulae (1) to (4):

$$0.6 \leq W(A+D)/W(T) \leq 0.995 \quad (1)$$

$$0.005 \leq W(B+C)/W(T) \leq 0.4 \quad (2)$$

$$0.01 \leq W(A)/W(A+D) \leq 0.99 \quad (3)$$

$$0.02 \leq W(B)/W(B+C) \leq 0.98 \quad (4)$$

wherein;
W(A) indicates the weight of (A) in the composition,
W(B) indicates the weight of (B) in the composition,
W(C) indicates the weight of (C) in the composition,
W(D) indicates the weight of (D) in the composition,
W(T) indicates the total weight of the composition.

Preferably, the formulae (1) to (4) are the following:

$$0.65 \leq W(A+D)/W(T) \leq 0.99 \quad (1')$$

$$0.01 \leq W(B+C)/W(T) \leq 0.35 \quad (2')$$

$$0.02 \leq W(A)/W(A+D) \leq 0.98 \quad (3')$$

$$0.04 \leq W(B)/W(B+C) \leq 0.96 \quad (4')$$

More preferably, they are the following:

$$0.70 \leq W(A+D)/W(T) \leq 0.985 \quad (1'')$$

$$0.015 \leq W(B+C)/W(T) \leq 0.30 \quad (2'')$$

$$0.03 \leq W(A)/W(A+D) \leq 0.97 \quad (3'')$$

$$0.05 \leq W(B)/W(B+C) \leq 0.95 \quad (4'')$$

If W(A+D)/W(T) is more than 0.995, or if W(B+C)/W(T) is less than 0.005, the compatibility between the EVOH (A) and the thermoplastic resin (D) is poor, and the effects of the invention could not be attained. If W(A+D)/W(T) is less than 0.6, or if W(B+C)/W(T) is more than 0.4, the proportions of the EVOH (A) and the thermoplastic resin (B) to the total amount of the composition are lowered, resulting in that the barrier properties intrinsic to the EVOH (A) and the melt moldability intrinsic to the thermoplastic resin (D) of the composition are not good.

If W(A)/W(A+D) is less than 0.01, the gas barrier properties of the compositions are not good; but if W(A)/W(A+D) is more than 0.99, the flexibility of the composition could not be satisfactorily improved.

If W(B)/W(B+C) is less than 0.02, the compatibility between the EVOH (A) and the polyamide resin (B) is low; but if W(B)/W(B+C) is more than 0.98, the compatibility between the ethylene-unsaturated carboxylic acid random copolymer or its metal salt (C) and the thermoplastic resin (D) is poor.

Poor compatibility between the constituent components brings about the reduction in the mechanical strength of the resin composition itself and even the reduction in the barrier properties, the heat sealability, the coatability, the mattability, the flexibility and the drawability of the composition. In addition, when the scrap in a process of producing multi-layered containers comprising thermoplastic resin and EVOH is recycled to produce multi-layered sheets and their thermoformed articles comprising the scrap-recycled layer, the sheets and the articles produced will have wavy patterns on their surfaces if the compatibility between the two components, thermoplastic resin and EVOH used is poor.

Preferably, the compositional ratio by weight of the polyamide resin (B) and the ethylene-unsaturated carboxylic acid random copolymer or its metal salt (C), W(B)/W(B+C) is at most 0.5, but more preferably at most 0.45, most preferably at most 0.4, in view of the thermal stability of the composition. Defining the compositional ratio by weight of W(B)/W(B+C) to the range noted above further improves the melt stability of the resin composition, resulting in that the composition is formed into articles with better outward appearance even in time-consuming melt molding. In that condition, therefore, the producibility of articles from the composition is improved, but the reason is not clear. However, it is believed that the reason is because the reaction between EVOH and polyamide will have some negative influences on the melt stability of the composition.

Where the constituent resins are formulated into the composition at the compositional ratio noted above, their dispersed conditions are not specifically defined. Depending on the use of the composition, however, it is desirable that the thermoplastic resin (D) forms a matrix phase while the EVOH (A) forms a dispersed phase in some cases; but, on the contrary, it is desirable that the EVOH (A) forms a matrix phase while the thermoplastic resin (D) forms a dispersed phase in some other cases.

The resin composition in which the thermoplastic resin (D) forms a matrix phase and the EVOH (A) forms a dispersed phase is advantageous in that it keeps the characteristics of the thermoplastic resin as a whole while additionally having the characteristics of EVOH added thereto. Accordingly, the resin composition of that type is favorable for heads of tube containers, as the heads comprising it shall get improved barrier properties while still having good heat sealability and mechanical strength; and it is also favorable for articles, as the articles comprising it shall have improved coatability while still getting good mechanical strength. In addition, the scrap of the resin composition of that type is well recycled for various applications, as comprising the thermoplastic resin as the major component and EVOH as the minor component.

The resin composition having the dispersed condition of that type may be obtained by reducing the ratio of W(A)/W(A+D), or by using (A) having a larger melt viscosity than (D).

In the resin composition of that type, the ratio of W(A)/W(A+D) is preferably at most 0.65, but more preferably at most 0.6. If the ratio of W(A)/W(A+D) is more than 0.65, the thermoplastic resin could hardly form a matrix phase.

As opposed to that, the resin composition in which the EVOH (A) forms a matrix phase and the thermoplastic resin (D) forms a dispersed phase is advantageous in that it keeps the excellent characteristics of EVOH as a whole while additionally having the characteristics of the thermoplastic resin added thereto. Accordingly, the resin composition of this type is favorable for films, as the films comprising it shall get improved flexibility and drawability while still having the excellent barrier properties intrinsic to EVOH; and it is also favorable for mat films, as the mat films comprising it shall get a lowered degree of surface gloss while still having the excellent stain resistance intrinsic to EVOH.

The resin composition having the dispersed condition of this type may be obtained by increasing the ratio of W(A)/W(A+D), or by using (A) having a smaller melt viscosity than (D).

In the resin composition of this type, the ratio of W(A)/W(A+D) is preferably at least 0.65, but more preferably at least 0.7. If the ratio of W(A)/W(A+D) is less than 0.65, EVOH in the composition could hardly form a matrix phase.

In the resin composition where the EVOH (A) forms a matrix phase and the thermoplastic resin (D) forms a dispersed phase, it is preferable that the thermoplastic resin (D) has a modulus of elasticity (ASTM D882) at 20° C. of at most 500 kg/cm$^2$, but more preferably at most 400 kg/cm$^2$, even more preferably at most 300 kg/cm$^2$.

EVOH is highly rigid but is poorly flexible, as compared with any other ordinary polymers, and is not resistant to bending. Therefore, it could not be used in flexible packaging applications. When EVOH is processed in a process comprising a drawing step for producing skin-pack wrappings, shrink wrappings, thermoformed films or sheets and the like, the thickness of the thermoformed articles is often uneven due to uneven drawing, resulting in that the gas barrier properties and even the outward appearance of the articles are poor. Therefore, in order to realize good bending resistance and drawability, desired is a composition having a lower Young's modulus and capable of being drawn by smaller force. To satisfy this requirement, adding the thermoplastic resin (D) to the EVOH (A) is effective. In particular, using the thermoplastic resin (D) having a modulus of elasticity at 20° C. of at most 500 kg/cm$^2$ is especially effective.

Examples of the thermoplastic resin (D) having a modulus of elasticity of at most 500 kg/cm$^2$ include very-low-density polyethylene (VLDPE), ethylene-vinyl acetate copolymer (EVA), ethylene-methyl methacrylate copolymer (EMAA), ethylene-ethyl acrylate copolymer (EEA), ethylene-propylene copolymer (EPR), styrenic elastomers (SEBS resins, etc.), etc.

The resin composition of the invention may optionally contain at least one of metal salts of higher aliphatic carboxylic acids and hydrotalcite compounds, in which the additional component prevents the reaction of the EVOH (A) with the polyamide resin (B) that may cause the thermal deterioration of the EVOH (A). In addition, as will be known from Examples to be mentioned hereinunder, multi-layered, co-extruded sheets that comprise a scrap-recycled layer of the composition are good, as having no wavy patterns on their surfaces.

As examples of the hydrotalcite compounds, mentioned are composite salts of $M_xAl_y(OH)_{2x+3y-2z}(A)_z.aH_2O$ (where M represents Mg, Ca or Zn; A represents $CO_3$ or $HPO_4$; and x, y, z and a each are a positive number). Especially preferred examples of those compounds are mentioned below.

$Mg_6Al_2(OH)_{16}CO_3.4H_2O$ $Mg_8Al_2(OH)_{20}CO_3.5H_2O$ $Mg_5Al_2(OH)_{14}CO_3.4H_2O$ $Mg_{10}Al_2(OH)_{22}(CO_3)_2.4H_2O$ $Mg_6Al_2(OH)_{16}HPO_4.4H_2O$ $Ca_6Al_2(OH)_{16}CO_3.4H_2O$ $Zn_6Al_6(OH)_{16}CO_3.4H_2O$ $Mg_{4.5}Al_2(OH)_{13}CO_3.3.5H_2O$

As the hydrotalcite compound, also employable herein is a hydrotalcite solid solution of $[Mg_{0.75}Zn_{0.25}]_{0.67}Al_{0.33}$ $(OH)_2 (CO_3)_{0.167}.0.45H_2O$ such as that disclosed in JP-A Hei-1-308439 (U.S. Pat. No. 4,954,557).

The metal salts of higher aliphatic carboxylic acids are metal salts of higher fatty acids having from 8 to 22 carbon atoms. The higher fatty acids having from 8 to 22 carbon atoms include lauric acid, stearic acid, myristic acid, etc.; and the metals include sodium, potassium, magnesium, calcium, zinc, barium, aluminium, etc. Of those, preferred are alkaline earth metals such as magnesium, calcium, barium, etc.

The content of the metal salts of higher aliphatic carboxylic acids and hydrotalcite compounds is preferably from 0.01 to 3 parts by weight, more preferably from 0.05 to 2.5 parts by weight, based on the total weight of the resin composition. The resin composition of the invention may optionally contain any other additives (heat stabilizers, plasticizers, UV absorbents, antioxidants, colorants, fillers, other resins, etc.), without detracting from the objects of the invention.

The composition of the invention can be produced easily by melt-kneading the constituent components in any ordinary melt-kneading device. The blending method for producing the composition is not specifically defined. For example, employable is a method comprising pelletizing the EVOH (A), the polyamide (B), the ethylene-unsaturated carboxylic acid random copolymer or its metal salt (C) and the thermoplastic resin (D) all at a time through a single-screw or twin-screw extruder and drying the resulting pellets; or a method comprising melt-mixing, cooling and pelletizing the polyamide resin (B) and the ethylene-unsaturated carboxylic acid random copolymer or its metal salt (C), followed by dry-blending the resulting pellets with the EVOH (A) and the thermoplastic resin (D), then pelletizing the resulting mixture through a single-screw or twin-screw extruder and further drying the resulting pellets.

Above all, as will be demonstrated in Examples to be mentioned hereinunder, preferred is a method comprising melt-blending the polyamide resin (B) and the ethylene-unsaturated carboxylic acid random copolymer or its metal salt (C) followed by melt-blending the resulting melt with the EVOH (A) and the thermoplastic resin (D), as the method effectively attains the objects of the invention. Though not clear, it is believed that the reason is because the previously prepared blend of the polyamide resin (B) and the ethylene-unsaturated carboxylic acid random copolymer or its metal salt (C), which acts as the compatibilizer for the EVOH (A) and the thermoplastic resin (D), will effectively improves the compatibility between the EVOH (A) and the thermoplastic resin (D) to give the four-component composition having stable morphology.

In the melt-blending operation, the blend formed will be uneven or will produce and have gels and agglomerates. Therefore, it is desirable that the blending and pelletization is effected by the use of a powerful extruder capable of blending the components in a high degree, while the hopper mouth is sealed with nitrogen gas, and that the extrusion is effected at low temperatures.

The resin composition of the invention that comprises the EVOH (A), the polyamide resin (B), the ethylene-unsaturated carboxylic acid random copolymer or its metal salt (C) and the thermoplastic resin (D) may be formed into single-layered articles, but may also be formed into two-layered or more multi-layered articles along with other various substrates. In the multi-layered articles, a thermoplastic resin layer may be adjacent to the layer of the composition of the invention. As preferred examples of the thermoplastic resin for the layer, mentioned are polyolefins, such as high-density, middle-density or low-density polyethylene; polyethylene copolymerized with vinyl acetate, acrylates or α-olefins such as butene, hexene, etc.; ionomer resins; polypropylene homopolymer; polypropylene copolymerized with α-olefins such as ethylene, butene, hexene, etc.; modified polypropylene blended with rubber polymers; as well as thermoplastic resins as prepared by adding maleic anhydride to those resins through mere addition or grafting. For the other thermoplastic resin layers in those, mentioned are polyamide resins, polyester resins, polystyrene resins, polyvinyl chloride resins, acrylic resins, polyurethane resins, polycarbonate resins, polyvinyl acetate resins, etc.

If desired, an adhesive resin layer may be interposed between the layer of the composition of the invention and the adjacent thermoplastic resin layer. The adhesive resin for the layer is not specifically defined, but typically includes olefinic polymers or copolymers (e.g., LLDPE, VLDPE, etc.), ethylene-vinyl acetate copolymers or ethylene-(meth) acrylate copolymers as grafted with unsaturated carboxylic acids or their anhydrides (maleic anhydride, etc.).

The method for producing the multi-layered structures is not specifically defined. For producing them, for example, employable is any technique of extrusion lamination, dry lamination, extrusion blow-molding, co-extrusion lamination, co-extrusion sheeting, co-extrusion pipe forming, co-extrusion blow-molding, co-extrusion injection-molding, solution coating, etc. If desired, the laminates thus produced may be re-heated at temperatures not higher than the melting point of EVOH and subjected to secondary processing of, for example, vacuum or pressure deep-drawing, blow molding or the like.

The layer constitution of the multi-layered structures is not specifically defined. However, taking the moldability and the production costs into consideration, preferred are thermoplastic resin layer/resin composition layer/thermoplastic resin layer; resin composition layer/adhesive resin layer/thermoplastic resin layer; thermoplastic resin layer/adhesive resin layer/resin composition layer/adhesive resin layer/thermoplastic resin layer. Where thermoplastic resin layers are provided as the both outer layers, the resins for those layers may differ or may be the same. The scrap as collected in the process of extrusion molding, blow molding or thermoforming may be recycled in the thermoplastic resin layer by blending it with the resin for the layer, or may be used to form a separate recycled layer.

The resin composition of the invention may be formed into articles having excellent barrier properties, mechanical strength, flexibility, drawability, melt stability, scrap recyclability, heat sealability, coatability, stain resistance and transparency, and it has many applications in various fields.

For example, the resin composition in which the thermoplastic resin (D) forms a matrix phase and the EVOH (A) forms a dispersed phase may be formed into single-layered barriers having excellent barrier properties, for example, as heads of two-piece tube containers, small-sized, single-layered barrier containers (bottles, cups, etc.), paper containers, barrier spouts for bag-in boxes, etc. In addition, it is useful for car parts of plastics with improved coatability, as well as for daily necessities of plastics or plastic parts of electric appliances for household use with stain resistance, etc. Moreover, it is further useful for fuel tanks or fuel tubes having barrier properties to organic solvents.

One embodiment of using the resin composition, in which the thermoplastic resin (D) forms a matrix phase and the EVOH (A) forms a dispersed phase, for producing a head of a two-piece tube container is described. To this use, the resin composition of the invention is favorable, as it improves the barrier properties of the head formed while still having excellent heat sealability and mechanical strength.

In this embodiment, the thermoplastic resin (D) to be used is preferably polyolefin, most preferably polyethylene, in view of the mechanical strength of the head formed and the heat sealability thereof to the tube body.

The compositional ratio by weight of the thermoplastic resin (D) and the EVOH (A), W(A)/W(A+D) is preferably at least 0.2, more preferably at least 0.3, most preferably at least 0.4, in order to ensure good barrier properties of the head.

Another embodiment of using the resin composition, in which the thermoplastic resin (D) forms a matrix phase and the EVOH (A) forms a dispersed phase, for producing a shaped article to be painted is described. To this use, the resin composition of the invention is favorable, as the paint-coatability of the article formed is good, and naturally the mechanical strength thereof is also good.

In this embodiment, the thermoplastic resin (D) to be used is preferably polyolefin, most preferably polypropylene, in view of the mechanical strength, the stiffness and the impact resistance of the article formed.

Also preferably, the EVOH (A) to be used has an ethylene content of at most 50 mol %, more preferably at most 45 mol %, most preferably at most 40 mol %, in view of the coatability of the article formed. The degree of saponification of the EVOH (A) to be used is preferably at least 90%, more preferably from 92 to 98%, most preferably from 93 to 97%.

The compositional ratio by weight of the thermoplastic resin (D) and the EVOH (A), W(A)/W(A+D) is preferably at most 0.3, more preferably at most 0.2, most preferably at most 0.15, in view of the mechanical strength, the stiffness and the impact resistance of the thermoplastic resin (D) and of the economical efficiency of the composition. For the same reason, the compositional ratio by weight of the sum of the polyamide resin (B) and the ethylene-unsaturated carboxylic acid random copolymer or its metal salt (C) to the total weight of the resin composition, W(B+C)/W(T) is preferably at most 0.15, more preferably at most 0.1.

On the other hand, the resin composition, in which the EVOH (A) forms a matrix phase and the thermoplastic resin (D) forms a dispersed phase, gets excellent flexibility, drawability and transparency to EVOH, and is therefore useful for flexible films, bag-in boxes that requires good bending resistance, and skin-pack wrappings, shrink wrappings, thermoformed containers and the like that require good drawability and thermoformability.

In addition, films of the resin composition, in which the EVOH (A) forms a matrix phase and the thermoplastic resin (D) forms a dispersed phase, may have a reduced degree of surface gloss while still getting the excellent stain resistance intrinsic to EVOH, and therefore, they are useful as mat films.

The thermoplastic resin (D) for such mat films is preferably polyolefin, more preferably polyethylene, in view of the mechanical strength and the economical efficiency of the films. The polyethylene for that use is preferably a resin having an ethylene content of at least 60 mol %. The comonomers which the resin, polyethylene may have in a ratio of less than 40 mol % include, for example, olefins such as propylene, butylene, etc.; dienes such as isoprene, butadiene, etc.; styrene and its derivatives; various acrylates, various methacrylates, vinyl acetate, etc. Apart from those, the resin, polyethylene may further have any other comonomers in a ratio of at most 1 mol %. The additional comonomers include, for example, $\alpha,\beta$-unsaturated fatty acids and their anhydrides such as maleic anhydride, etc.; and compounds having various functional groups such as methacrylic acid glycidyl ether, ethylene oxide, propylene oxide, etc. In particular, polyethylene resins copolymerized or grafted with from 0.0005 to 0.5 mol % of any of $\alpha,\beta$-unsaturated fatty acids and their anhydrides are especially favorably used in the invention.

In the resin composition for mat films, the amount of the thermoplastic resin (D) is preferably from 4 to 45% by weight, more preferably from 10 to 30% by weight, based on the total weight of the components (A), (B), (C) and (D), in order to more effectively exhibit the effects. If the resin (D) content is less than 4% by weight, the mat films could not have a satisfactorily reduced degree of surface gloss. On the other hand, if the resin (D) content is more than 45% by weight, the morphology of the composition will vary, often resulting in that the mat films could not have the characteristics intrinsic to EVOH films.

In the resin composition for mat films, the ratio by weight of the polyamide resin (D) to the ethylene-unsaturated carboxylic acid random copolymer or its metal salt (C) is from 2/98 to 70/30, but preferably from 3/97 to 60/40, most preferably from 5/95 to 50/50. If the ratio of the polyamide resin is less than 2%, the dispersibility of the composition will be poor, resulting in that not only the degree of surface gloss of the mat films formed could not be satisfactorily reduced but also the mechanical characteristics thereof will be poor. If, however, the ratio of the polyamide resin is more than 70%, EVOH and nylon in the composition will react too greatly with each other, resulting in that the producibility of mat films from the composition will be lowered.

In the resin composition for mat films, the sum of the polyamide resin (B) and the ethylene-unsaturated carboxylic acid random copolymer or its metal salt (C) based on the total amount of the components (A), (B), (C) and (D) is from 1 to 20% by weight, but preferably from 2 to 15% by weight, most preferably from 3 to 10% by weight. If the sum of (B) and (C) is less than 1% by weight, the dispersibility of the components (A) and (B) in the composition will be poor, resulting in that not only the degree of surface gloss of the mat films formed could not be satisfactorily reduced but also the mechanical characteristics thereof will be poor. If, however, the sum of (B) and (C) is more than 20% by weight, the dispersibility of the thermoplastic resin (D) in the composition will be too great, resulting in that the degree of surface gloss of the mat films formed could not be satisfactorily reduced.

It is important that at least one surface of the mat films formed from the resin composition of the invention shall have a degree of surface gloss of at most 60%, but preferably at most 50%, most preferably at most 40%. Films having a degree of surface gloss of more than 60% could no more be mat films. The degree of surface gloss as referred to herein is a mean value of the data off non-defined five points of one sample as measured with a Murakami's surface gloss meter.

The thickness of the mat films is not specifically defined, but preferably falls between 10 and 50 $\mu$m. Thick films having a thickness of more than 50 $\mu$m are too rigid, and when they are laminated on substrates of interior materials such as cellulosic wallpaper, polyvinyl chloride-based plastic wallpaper and the like, the patterns capable of being formed on their surfaces will be limited.

Laminating the mat films of the invention on substrates of interior materials such as wall paper, decorative plywood and the like produces various good results. For example, the mat films prevent plasticizer and other unfavorable substances from bleeding out; they improve the stain resistance of the laminates to various contaminants; and the laminates thus having non-glossy appearance get a high-quality feel. Laminating the mat films on leather or leatherette produces the same good results.

Still another preferred embodiment of the invention is a scrap recycling method of using a combination of (B) a polyamide and (C:) an ethylene-unsaturated carboxylic acid random copolymer or its metal salt as the compatibilizer for recycling the scrap of shaped articles that comprise, as the major components, (A) an EVOH and (D) a thermoplastic resin, especially the scrap of multi-layered articles comprising a layer of (A) and a layer of (D). The shaped articles comprising, as the major components, (A) an EVOH and (D) a thermoplastic resin as referred to herein indicate those in which the sum of (A) and (D) is at least a half of the total weight of the article.

Where the scrap in the process of extrusion molding, blow molding, thermoforming or the like for producing shaped articles comprising (A) an EVOH and (D) a thermoplastic resin is recycled as a separate recycled layer in multi-layered sheets or other thermoformed articles, the sheets and articles having the separate recycled layer often have wavy patterns on their surfaces owing to the poor compatibility between the EVOH (A) and the thermoplastic resin (D). Adding the polyamide (B) and the ethylene-unsaturated carboxylic acid random copolymer or its salt (C) to the molding composition comprising (A) and (D) significantly overcomes the problem of such wavy patterns. Along with the components (B) and (C), adding to the molding composition at least one of metal salts of higher aliphatic carboxylic acids and hydrotalcite compounds further augments the effect of the components (B) and (C). Preferably, the amount of the additional component of metal salts of higher aliphatic carboxylic acids and hydrotalcite compounds may be from 0.1 to 50 parts by weight based on the sum of (B)+(C).

The thus-recycled resin composition is effectively used in multi-layered structures having at least one scrap-recycled layer. For example, multi-layered sheets for thermoforming that comprise the scrap-recycled layer can be thermoformed into containers with good outward appearance. In particular, preferred are multi-layered structures having at least one EVOH layer in addition to the scrap-recycled layer, as they get good barrier properties.

For recycling the scrap of multi-layered structures, employable are other different methods apart from the method noted above that comprises adding the polyamide resin (B) and the ethylene-unsaturated carboxylic acid random copolymer or its metal salt (C) directly to the scrap. For example, the components (B) and (C) may be previously blended with the composition for any one layer of multi-layered structures; or they may form at least one layer of multi-layered structures, for example, an adhesive layer between the layers of EVOH and polyolefin of multi-layered structures.

The thermoplastic resin (D) to be in the recycled composition is not specifically defined, but preferred is polypropylene in view of the mechanical strength, the impact resistance, the secondary processability and the economical efficiency of the composition. Also preferred is polystyrene in view of the stiffness, the surface gloss, the secondary processability and the economical efficiency of the composition.

In the composition, the compositional ratio by weight of the thermoplastic resin (D) and the EVOH (A), W(A)/W(A+D) is preferably at most 0.3, more preferably at most 0.25, most preferably at most 0.2, in view of the mechanical strength, the stiffness and the impact resistance of the thermoplastic resin (D) and of the economical efficiency of the composition. For the same reason, the compositional ratio by weight of the sum of the polyamide resin (B) and the ethylene-unsaturated carboxylic acid random copolymer or its metal salt (C) to the total weight of the resin composition, W(B+C)/W(T) is preferably at most 0.15, more preferably at most 0.1, most preferably at most 0.08.

As has been mentioned hereinabove, the resin composition of the present invention has excellent barrier properties, mechanical strength, flexibility, drawability, melt stability, scrap-recyclability, heat sealability, coatability, stain resistance and transparency, and has many applications in various fields.

Figure 1:
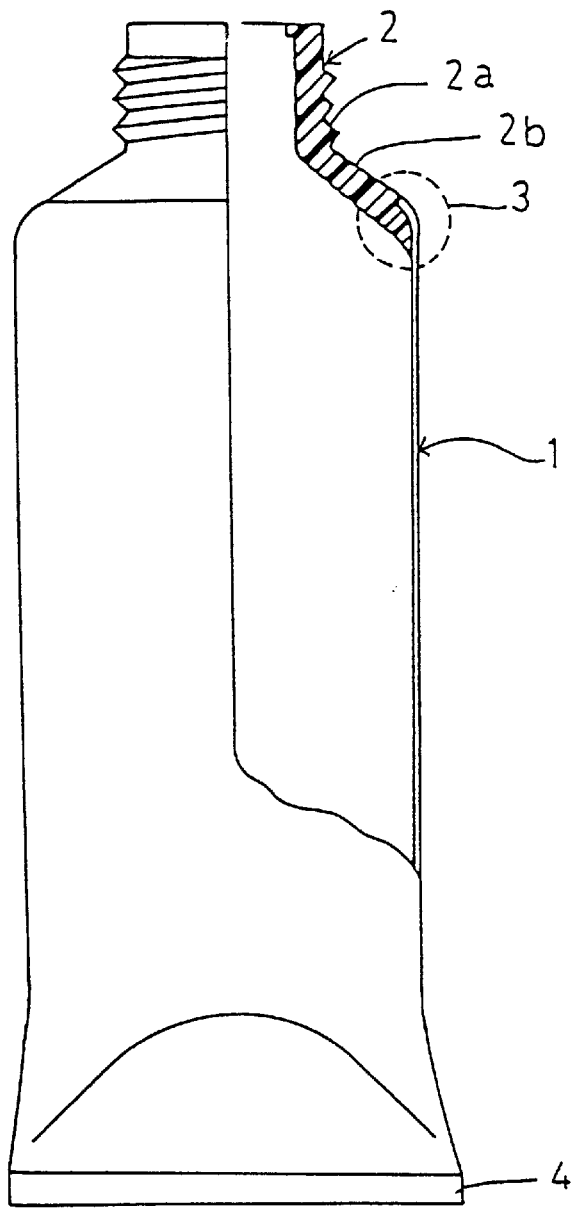
FIG. 1 is a schematic side view partly in section of a tube container of one embodiment of the invention.
Figure 2:
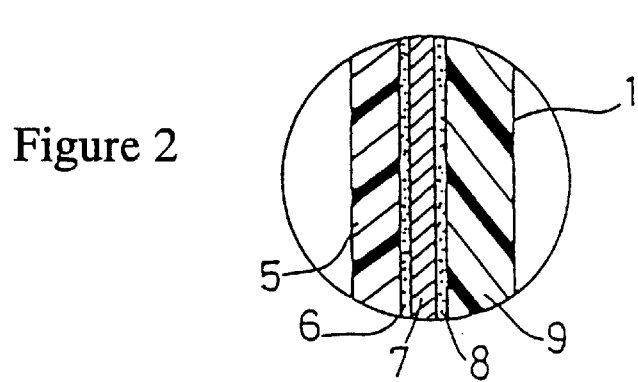
FIG. 2 is an enlarged view of the cross-section of the tube container of FIG. 1.

The numeral references in FIG. 1 and FIG. 2 are as follows:

1 Cylindrical Body
2 Head
2a Male Screw
2b Shoulder
3 Shoulder of Head
4 Heat-sealed Bottom
5 Heat-seal Layer (LDPE)
6 Adhesive Resin
7 Barrier Resin EVOH
8 Adhesive Resin
9 Outer Layer (LDPE)

BEST MODES OF CARRYING OUT THE INVENTION

Now, the invention is described in more detail with reference to the following Examples, which, however, are not intended to restrict the scope of the invention.

Of the following Examples, resin materials shown in Tables 1 to 4 were used in <Examples of Head of Two-piece Tube Container>, <Examples for Coatability>, <Examples for Scrap Recyclability> and <Examples of Flexible Film>. Table 1 shows examples of EVOH (A); Table 2 shows those of polyamide resin (B); Table 3 shows those of ethylenic copolymer resin (C); and Table 4 shows those of thermoplastic resin (D).

TABLE 1

Ethylene-Vinyl Alcohol Copolymers

|  | Ethylene Content (mol%) | Degree of saponification (mol%) | Melting Point (° C.) | MFR[*1)] (g/10 min.) |
|---|---|---|---|---|
| A-1 | 27 | 99.7 | 191 | 6[*2)] |
| A-2 | 32 | 99.5 | 183 | 1.6 |
| A-3 | 44 | 99.5 | 165 | 6 |
| A-4 | 48 | 99.6 | 160 | 15 |
| A-5 | 32 | 96.5 | 170 | 10 |

[*1)]Condition for measurement: 190° C.–2160 g
[*2)]Condition for measurement: 210° C.–2160 g

TABLE 2

Polyamide Resins

|  | Name of Resin | Copolymerization Ratio of 6-PA/12-PA (mol%) | Melting Point (° C.) | Trade Name |
|---|---|---|---|---|
| B-1 | 6-Polyamide | 100/0 | 225 | Ube Nylon 1011FB |
| B-2 | 6/12-Polyamide | 80/20 | 200 | Ube Nylon 7024B |

TABLE 3

Ethylenic Copolymer Resins

|  | Type of Resin | MFR [*1)] (g/10 min) | Density (g/cc) | Melting Point (° C.) | Remarks |
|---|---|---|---|---|---|
| C-1 | Ethylene-Methacrylic Acid Random Copolymer (EMAA) | 7 | 0.94 | 98 | *2) |
| C-2 | Ethylene-Methacrylic Acid Random Copolymer (Ionomer) | 10 | 0.94 | 95 | *3) |
| C-3 | Maleic Anhydride-Grafted Modified Polyethylene | 3 | 0.91 | 120 | *4) |
| C-4 | Partially-saponified Ethylene-Vinyl Acetate Copolymer | 5 | 0.97 | 110 | *5) |

*1) Condition for measurement: 190° C. - 2160 g
*2) Degree of copolymerization with methacrylic acid: 4.3 mol %
*3) Degree of copolymerization with methacrylic acid: 7.5 mol %
Degree of neutralization: 40%, Metal for neutralization: zinc
*4) Maleic anhydride content: 2.1 wt. %
*5) Ethylene Content: 89 mol %, Degree of saponification: 97%

TABLE 4

Thermoplastic Resins

|  | Type of Resin *1) | Solubility Parameter | Modulus of Elasticity (kg/cm$^2$) *2) | Melting Point (° C.) | MFR *3) (g/10 min) | Trade Name |
|---|---|---|---|---|---|---|
| D-1 | HDPE | 8.6 | 3700 | 128 | 5 | Showa Denko; HD-5050 |
| D-2 | LDPE | 8.6 | 600 | 110 | 2 | Mitsui Chemical; Misolan 9725 |
| D-3 | PP | 8.0 | — | 165 | 15 *4) | Ube; Polypropylene J130G |
| D-4 | PP | 8.0 | — | 165 | 1.2 *4) | Mitsubishi; Noblen EA7A |
| D-5 | PS | 10.6 | — | — | 3 *5) | Idemitsu; Styrol ET-61 |
| D-6 | VLDPE | 8.5 | 260 | 98 | 9.5 | Dow Chemical; Affinity FW1650 |
| D-7 | PET | 11.5 | — | 252 | — | Kuraray; KS750RCT |
| D-8 | EVA | 9.2 | 90 | 72 | 6 | Mitsui Dupont; EVAFLEX EV260 |
| D-9 | PU | 11.6 | 120 | — | — | Kuraray; Kuramilon 2190 |

*1) HDPE: High-density polyethylene
LDPE: Low-density polyethylene
PP: Polypropylene
PS: Polystyrene
VLDPE: Very-low-density polyethylene (ethylene-1-octene copolymer)
PET: Polyethylene terephthalate

TABLE 4-continued

Thermoplastic Resins

| Type of Resin *1) | Solubility Parameter | Modulus of Elasticity (kg/cm²) *2) | Melting Point (° C.) | MFR *3) (g/10 min) | Trade Name |
|---|---|---|---|---|---|

EVA: Ethylene-vinyl acetate copolymer (vinyl acetate content: 28 wt. %)
PU: Polyurethane (ester-type polyurethane)
*2) Condition for measurement: ASTM D822
*3) Condition for measurement: 190° C. - 2160 g
*4) Condition for measurement: 230° C. - 2160 g
*5) Condition for measurement: 200° C. - 2160 g

EXAMPLES OF HEAD OF TWO-PIECE TUBE CONTAINER

Example 1-1

Of the resins shown in Tables 1 to 4, a blend comprised of 40 parts by weight of EVOH (A-3), 5 parts by weight of polyamide (B-2), 15 parts by weight of ethylene-methacrylic acid random copolymer (EMAA; C-1) and 40 parts by weight of high-density polyethylene (HDPE; D-1) was prepared according to the method mentioned below. Precisely, polyamide (B-2) and EMAA (C-1) were fed into a vent-type, twin-screw extruder, and pelletized through it at 220° C. in the presence of nitrogen. The resulting blend pellets were further blended with EVOH (A-3) and HDPE (D-1), in the same manner as above, to obtain the intended resin composition pellets.

Next, using the tube container-molding machine for injection molding disclosed in JP-A Sho-56-25411 (JP-B Sho-64-7850), the resin composition pellets were molded into tube containers. In this process, the resin composition pellets were fed into the injection-molding machine, while a cylindrical tube which had been previously formed for bodies of the containers was fed into the mold of the machine.

The injection-molding machine used herein is a 35 mm$\phi$ in-line screw-type injection-molding machine, in which were formed the heads of the tube containers at a cylinder temperature of 240° C. and at a nozzle temperature of 235° C. The tube containers thus formed herein had an outer diameter of 35 mm$\phi$, outer and inner diameters of the mouth of 12 mm$\phi$ and 7 mm$\phi$, respectively, and a wall thickness of the head of 2 mm. The cylindrical tube for the bodies was prepared through co-extrusion using a ring die, and had a multi-layered structure of low-density polyethylene (LDPE, Mitsui Petro-chemical's Ultzex 3520L, having a thickness of 150 $\mu$)/adhesive resin (Mitsui Petro-chemical's Admer NF500, having a thickness of 20 $\mu$)/EVOH (B-l,having a thickness of 20 $\mu$)/adhesive resin(Mitsui Petro-Chemical's Admer NF500, having a thickness of 20 $\mu$)/LDPE (Mitsui Petro-chemical's Ultzex 3520L, having a thickness of 150 $\mu$).

Observing the head formed herein with an electronic microscope verified that HDPE (D-1) formed a matrix phase and EVOH (A-3) formed a dispersed phase in the head.

The tube containers obtained herein were tested for the contents preservability, the heat sealability, the mechanical strength of the head, and the outward appearance of the head, according to the methods mentioned below. To determine the barrier strength of the head itself, the resin pellets for the head were formed into a film, and the oxygen transmission rate (OTR) -through the film was measured. The results obtained are shown in Table 5.

(1) Oxygen Transmission Rate (OTR):

A resin composition sample was melt-extruded through a T-die at 235° C. into a film having a thickness of 100$\mu$. The oxygen transmission rate through the film was measured at 20° C. and 65% RH, using an oxygen transmission tester, Ox-Tran 100 Model (manufactured by Modern Control Inc.).

(2) Contents Preservability:

A tube container sample was filled with "miso" (soy bean paste) through its bottom opening, which was then heat-sealed. Next, a disc of aluminium foil (thickness: 25$\mu$) was applied to the mouth, and the tube container was then closed by screwing a cap. The tube container thus filled with "miso" was allowed to stand in a thermo-hygrostat at 40° C. and 50% RH. After 24 hours, it was taken out, and the "miso" kept in contact with the inner surface of its head was checked with the naked eye for the degree of discoloration if any. All tube containers prepared herein were evaluated for the "miso" preservability according to the following criteria A to D:

A: Not discolored.
B: Discolored in pale brown.
C: Discolored in brown.
D: Discolored in reddish brown.

(3) Heat-sealability:

The body of a tube container sample was longitudinally cut at 2 points in the opposite sides above a line of heat-sealing to the head to obtain a test piece having a width of 15 mm. The cut-out test piece was mounted on a tensile tester with the both edges being fixed, and the peeling strength of the heat-sealed part was measured at 20° C. and 65% RH according to JISK 7127.

A: More than 3.0 kg.
B: From 2.5 to 3.0 kg.
C: From 2.0 to 2.5 kg.
D: Less than 2.0 kg.

(4) Strength of Head:

At 20° C. and 65% RH, a tube container sample was subjected to repeated cycles of screwing and unscrewing its cap for a total of 30 times. After the cycle test, the sample was checked with the naked eye and with the aid of a magnifier for chips and cracks, if any, in the screw-thread part of the neck and for cracks, if any, in the head. All tube containers prepared herein were tested in that manner and evaluated according to the criteria A to D mentioned below.

In screwing the cap, used was a torque meter. Screwing the cap was effected at a torque of 5 kg·cm.

A: Neither chips nor cracks found.
B: Minor cracks found through the magnifier.
C: Minor cracks found with the naked eye.
D: Small cracks and chips found with the naked eye.

(5) Outward Appearance of Head:

The head of each tube container sample was checked with the naked eye for its outward appearance (surface condition, and discoloration and formation of gels and fish eyes, if any). Tube containers produced immediately after the start of injection molding, and those produced in 24 hours after the start thereof were checked in that manner, and evaluated according to the following criteria A to D:

A: Good with no change.
B: Minor gels and fish eyes found, or the surface roughened a little.
C: Definite gels and fish eyes found, or the surface roughened partly.
D: Definite gels and fish eyes found, or the surface roughened thoroughly. The head discolored in pale yellow.

FIG. 1 shows the outline partly in section of the tube container produced in Examples. As illustrated, the cylindrical body 1 is integrated with the head 2 by heat-sealing at the shoulder 3 of the head 2, the head 2 has a male screw 2a at its top and a shoulder 2b that follows the male screw 2a, and the body 1 is further integrated with the heat-sealed bottom 4. FIG. 2 shows the constitution of the cylindrical body 1, which is composed of a heat-seal layer (LDPE) 5, an adhesive resin 6, a barrier resin EVOH 7, an adhesive resin 8 and an outer layer (LDPE) 9 as laminated in that order from inside.

Examples 1-2 to 1-8, and Comparative Examples 1-1 to 1-8

Various tube containers were produced in the same manner as in Example 1-1, except that resin pellets shown in Table 5 were used in place of the four-component resin pellets in Example 1-1

Precisely, the resins and their ratios were varied as in Table 5. To prepare two-component and three-component resin compositions, the constituent resins were blended in one kneading operation. To prepare one-component resin compositions, the constituent resin was not kneaded. The results of evaluation of those tube containers are shown in Table 5.

Example 1-9

Tube containers were produced in the same manner as in Example 1-1, except that the four resin components were kneaded only once and all at a time, and pelletized. The results of evaluation of the tube containers are shown in Table 5.

TABLE 5

| | \multicolumn{8}{c}{Resin Composition} | | | | | | | |
|---|---|---|---|---|---|---|---|---|
| | A wt. pts. | B wt. pts. | C wt. pts. | D wt. pts. | W(A)/W(A + D) | W(B + C)/W(T) | W(B)/W(B + C) | Component of Matrix Phase |
| Example 1-1 | A-3 40 | B-2 5 | C-1 15 | D-1 40 | 0.50 | 0.20 | 0.25 | D-1 |
| Example 1-2 | A-4 40 | B-2 5 | C-2 15 | D-1 40 | 0.50 | 0.20 | 0.25 | D-1 |
| Example 1-3 | A-4 40 | B-2 5 | C-1 15 | D-1 40 | 0.50 | 0.20 | 0.25 | D-1 |
| Example 1-4 | A-4 35 | B-2 10 | C-2 15 | D-1 40 | 0.47 | 0.25 | 0.40 | D-1 |
| Example 1-5 | A-3 50 | B-1 10 | C-2 10 | D-2 30 | 0.63 | 0.20 | 0.50 | D-2 |
| Example 1-6 | A-4 45 | B-1 7 | C-1 8 | D-2 40 | 0.53 | 0.15 | 0.47 | D-2 |
| Example 1-7 | *2) 45 | B-1 10 | C-1 10 | D-2 35 | 0.56 | 0.20 | 0.50 | D-2 |
| Example 1-8 | A-4 40 | B-2 15 | C-2 5 | D-1 40 | 0.50 | 0.20 | 0.75 | D-1 |
| Example 1-9 | A-4 40 | B-2 5 | C-2 15 | D-1 40 | 0.50 | 0.20 | 0.25 | D-1 |
| Comparative Example 1-1 | — | — | — | D-1 100 | 0.00 | 0.00 | — | D-1 |
| Comparative Example 1-2 | A-4 40 | — | — | D-1 60 | 0.40 | 0.00 | — | D-1 |
| Comparative Example 1-3 | A-4 40 | B-2 20 | — | D-1 40 | 0.50 | 0.20 | — | D-1 |
| Comparative Example 1-4 | A-4 40 | — | C-1 20 | D-1 40 | 0.50 | 0.20 | — | D-1 |
| Comparative Example 1-5 | A-4 100 | — | — | — | 1.00 | 0.00 | — | A-4 |
| Comparative Example 1-6 | A-4 60 | B-2 5 | C-2 15 | D-1 20 | 0.75 | 0.20 | 0.25 | A-4 |
| Comparative Example 1-7 | A-4 40 | B-2 5 | C-3 15 | D-1 40 | 0.50 | 0.20 | 0.25 | D-1 |
| Comparative | A-4 | — | C-4 | D-1 | 0.50 | 0.20 | 0.25 | D-1 |

TABLE 5-continued

| | | | | | | |
|---|---|---|---|---|---|---|
| Example 1-8 | 40 | | 20 | 40 | | |

| | | | | | Appearance of Head | | |
|---|---|---|---|---|---|---|---|
| | OTR *1) | Preservability | Heat-sealability | Strength of Head | Just after start of molding | 24 hours after start of molding | Remarks |
| Example 1-1 | 16 | A | A | A | A | A | |
| Example 1-2 | 15 | A | A | A | A | A | |
| Example 1-3 | 14 | A | A | A | A | A | |
| Example 1-4 | 40 | B | A | A | A | A | |
| Example 1-5 | 12 | A | A | B | A | A | |
| Example 1-6 | 10 | A | B | B | A | A | |
| Example 1-7 | 13 | A | A | A | A | A | |
| Example 1-8 | 18 | A | A | A | A | B | |
| Example 1-9 | 20 | A | B | B | B | B | Kneaded once all at a time. |
| Comparative Example 1-1 | 3300 | D | A | A | A | A | |
| Comparative Example 1-2 | 300 | C | D | D | C | C | |
| Comparative Example 1-3 | 80 | B | D | C | D | D | |
| Comparative Example 1-4 | 19 | A | C | C | A | B | |
| Comparative Example 1-5 | 2 | A | D | C | A | A | |
| Comparative Example 1-6 | 7 | A | C | C | A | A | |
| Comparative Example 1-7 | 25 | A | B | A | A | C | |
| Comparative Example 1-8 | 19 | A | B | C | A | B | |

*1) unit: cc · 20 $\mu$/m² · day · atm.
*2) A-2 (20 wt. pts.) and A-4 (25 wt. pts.) were used.

EXAMPLES FOR COATABILITY

Example 2-1

Of the resins shown in Tables 1 to 4, a blend comprised of 10 parts by weight of EVOH (A-1), 1 part by weight of polyamide (B-1), 2 parts by weight of ionomer (C-2) and 87 parts by weight of polypropylene (D-3) was prepared according to the method mentioned below. Precisely, polyamide (B-1) and ionomer (C-2) were fed into a vent-type, twin-screw extruder, and pelletized through it at 220° C. in the presence of nitrogen. The resulting blend pellets were further blended with EVOH (A-1) and polypropylene (D-3), in the same manner as above, to obtain the intended resin composition pellets.

Using an injection-molding machine, FS 80S Model (manufactured by Nissei Resin Industry Co.), the resin pellets prepared herein were molded at 220° C. into test pieces for mechanical strength and those for coatability. Observing the test pieces with an electronic microscope verified that polypropylene (D-3) formed a matrix phase and EVOH (A-1) formed a dispersed phase in the test pieces. The test pieces were tested for their quality according to the methods mentioned below, and the test results are shown in Table 6.

(1) Tensile Strength (kg/cm²):
According to ASTM D638, the samples were tested at room temperature.
(2) Breaking Elongation (%):
According to ASTM D638, the samples were tested at room temperature.
(3) Bending Strength (kg/cm²):
According to ASTM D790, the samples were tested at room temperature.
(4) Impact Strength (kg·cm/cm):
According to ASTM D256, each sample having a thickness of 3.2 mm was notched and tested at 20° C. and 65% RH.
(5) Coatability:
Each sample was wiped with gauze containing isopropyl alcohol, and coated with urethane paint without being pre-coated with primer, and then baked at 80° C. for 30 minutes to form a paint layer thereon. The thus-coated sample was kept at 23° C. and 65% RH for 24 hours or longer, and the adhesion strength (primary adhesion strength) of the paint layer was measured in a cross-cut peeling test according to JIS D02024. 15. Apart from this, the sample was dipped in hot water at 40° C. for 240 hours, and was subjected to the same peeling test to measure the adhesion strength (secondary adhesion strength) of the paint layer. The samples tested were evaluated on the basis of their surface condition, and ranked as follows:
A: Good surface gloss with no peeling.
B: No peeling, but the surface gloss lowered a little.
C: No peeling, but the surface gloss lowered greatly.
D: Peeled.
(6) Outward Appearance:
Test pieces were checked with the naked eye for their outward appearance (surface condition, and gels and fish eyes, if any). Those produced immediately after the start of injection molding and those produced in 24 hours after the start thereof were checked in that manner, and evaluated according to the following criteria A to C:

A: Good with no change.

B: Minor gels and fish eyes found, or the surface roughened a little.

C: Definite gels and fish eyes found, and the surface roughened partly.

Examples 2-2 to 2-4, and Comparative Examples 2-1 to 2-6

Various test pieces were produced in the same manner as in Example 2-1, except that resin pellets shown in Table 6 were used in place of the four-component resin pellets in Example 2-1. Precisely, the resins and their ratios were varied as in Table 6. To prepare two-component and three-component resin compositions, the constituent resins were blended in one kneading operation. To prepare one-component resin compositions, the constituent resin was not kneaded. The results of evaluation of those test pieces are shown in Table 6.

Example 2-5

Test pieces were produced in the same manner as in Example 2-1, except that the four resin components were kneaded only once and all at a time, and pelletized. The results of evaluation of the test pieces are shown in Table 6.

TABLE 6

| | Resin Composition | | | | | | | |
|---|---|---|---|---|---|---|---|---|
| | A wt. pts. | B wt. pts. | C wt. pts. | D wt. pts. | W(A)/W(A + D) | W(B + C)/W(T) | W(B)/W(B + C) | Component of Matrix Phase |
| Example 2-1 | A-1 10 | B-1 1 | C-2 2 | D-3 87 | 0.10 | 0.03 | 0.33 | D-3 |
| Example 2-2 | A-2 15 | B-2 2 | C-1 3 | D-3 80 | 0.16 | 0.05 | 0.40 | D-3 |
| Example 2-3 | A-5 7 | B-1 2 | C-2 1 | D-3 90 | 0.07 | 0.03 | 0.67 | D-3 |
| Example 2-4 | *1) 15 | B-2 4 | C-1 1 | D-3 80 | 0.16 | 0.05 | 0.80 | D-3 |
| Example 2-5 | A-1 10 | B-1 1 | C-2 2 | D-3 87 | 0.10 | 0.03 | 0.33 | D-3 |
| Comparative Example 2-1 | A-1 10 | — | — | D-3 90 | 0.10 | 0.00 | — | D-3 |
| Comparative Example 2-2 | A-1 10 | B-1 3 | — | D-3 87 | 0.10 | 0.03 | — | D-3 |
| Comparative Example 2-3 | A-1 10 | — | C-2 3 | D-3 87 | 0.10 | 0.03 | — | D-3 |
| Comparative Example 2-4 | — | — | — | D-3 100 | — | 0.00 | — | D-3 |
| Comparative Example 2-5 | A-1 77 | B-1 1 | C-2 2 | D-3 20 | 0.79 | 0.03 | 0.33 | A-1 |
| Comparative Example 2-6 | A-1 10 | B-1 1 | C-3 2 | D-3 87 | 0.10 | 0.03 | 0.33 | D-3 |

| | Quality Evaluation | | | | | | | | |
|---|---|---|---|---|---|---|---|---|---|
| | | | | | Coat Film Adhesiveness | | Appearance | | |
| | Tensile Strength (kg/cm²) | Breaking Elongation (kg/cm²) | Bending Strength (kg/cm²) | Impact Strength (kg/cm²) | Primary Adhesion | Secondary Adhesion | Just after start of molding | X hours after start of molding | Remarks |
| Example 2-1 | 360 | 90 | 520 | 4.5 | A | A | A | A | |
| Example 2-2 | 370 | 80 | 550 | 4.6 | A | A | A | A | |
| Example 2-3 | 360 | 95 | 530 | 4.5 | A | A | A | B | |
| Example 2-4 | 380 | 92 | 540 | 4.8 | A | A | A | B | |
| Example 2-5 | 340 | 80 | 500 | 4.2 | A | B | B | B | Kneaded once all at a time. |
| Comparative Example 2-1 | 350 | 10 | 580 | 2.2 | A | D | C | C | |
| Comparative Example 2-2 | 360 | 30 | 550 | 2.5 | A | C | B | C | |
| Comparative Example 2-3 | 350 | 50 | 540 | 2.9 | A | C | A | B | |
| Comparative Example 2-4 | 370 | 110 | 550 | 4.6 | D | D | A | A | |
| Comparative Example 2-5 | 550 | 20 | 600 | 1.5 | A | A | B | B | |
| Comparative Example 2-6 | 360 | 80 | 500 | 3.5 | A | B | A | C | |

*1) A-3 (5 wt. pts.) and A-5 (10 wt. pts.) were used.

EXAMPLES FOR SCRAP RECYCLABILITY

Example 3-1

The resins used in the following Examples are those in Tables 1 to 4.

First prepared was a three-layered sheet (560 μm/100 μm/560 μm) having outer polypropylene (PP; D-4) layers on the both surfaces of an EVOH (A-2) layer, through co-extrusion. This was ground into scrap [(A-2)/(D-4)=10/86, parts by weight].

On the other hand, 1 part by weight of polyamide (B-1) and 3 parts by weight of ionomer (C-3) were fed into a vent-type, twin-screw extruder, and pelletized through it at 220° C. in the presence of nitrogen.

Next, 96 parts by weight of the scrap comprised of EVOH (A-2) and polypropylene (D-4) were mixed with 4 parts by weight of the resin pellets comprised of polyamide (B-1) and ionomer (C-2), and pelletized through a fullflight-type, single-screw extruder.

As a result of the process noted above, obtained were resin composition pellets (hereinafter referred to as REG) comprised of 10 parts by weight of EVOH (A-2), 1 part by weight of polyamide (B-1), 3 parts by weight of ionomer (C-3) and 86 parts by weight of polypropylene (D-4).

The thus-obtained, four-component resin composition pellets, EVOH (A-2), polypropylene (D-4) and adhesive resin (maleic anhydride-modified polypropylene) were put into separate extruders, and co-extruded, using a 4-type/7-layer co-extrusion apparatus, into a 7-layered sheet (overall thickness: 1000μ) having a constitution of PP/REG/adhesive resin/EVOH/adhesive resin/REG/PP (300/150/25/50/25/150/300 μ). Precisely, PP was extruded through a single-screw (65 mmφ) extruder at 240° C.; REG through a single-screw (40 mmφ) extruder at 220° C.; the adhesive resin through a single-screw (40 mmφ) extruder at 220° C.; and EVOH through a single-screw (40 mmφ) extruder at 210° C. 24 hours and even 72 hours after the start of extrusion, the sheets obtained were all had good outward appearance, without showing wavy patterns and delamination that might be caused by poor compatibility and bad flow, if any, of REG. Observing the REG layers of the sheets obtained herein with an electronic microscope verified that polypropylene (D-4) formed a matrix phase and EVOH (A-2) formed a dispersed phase in the layers.

Using a thermoforming machine (manufactured by Asano Seisaku-sho Co.), the sheets obtained in 24 hours and 72 hours after the start of extrusion were thermoformed into cups (size of mold: 70φ×70 mm). The thermoforming condition was as follows: The pressure of compression air introduced was 5 kg/cm2; the plug was of syntactic foam and its size was 45φ×65 mm; the sheet temperature was 150° C.; the plug temperature was 20° C., and the mold temperature was 70° C. Each cup formed was checked with the naked eye for its outward appearance. Like the sheets noted above, the cups formed therefrom all had good outward appearance, without showing wavy patterns and delamination that might be caused by poor compatibility and bad flow, if any, of blend pellets of REG.

The sheets and the cups were evaluated for their outward appearance according to the following criteria:

A: Good and uniform surface with neither wavy patterns nor delamination.
B: Good and uniform surface with no delamination, but minor wavy patterns found partly.
C: Definite wavy patterns and delamination found on the whole surface.
D: Definite wavy patterns, delamination, gels and fish eyes found on the whole surface.

The results obtained are shown in Table 7.

Examples 3-2 to 3-5, and Comparative Examples 3-1 to 3-6

Various resin compositions were produced in the same manner as in Example 3-1, except that resin pellets shown in Table 7 were used in place of the four-component resin pellets in Example 3-1. Precisely, the resins and their ratios were varied as in Table 7 to prepare resin pellets herein. To prepare two-component and three-component resin compositions, the constituent resins were blended in one kneading operation.

Seven-layered sheets having the same constitution as in Example 3-1 were produced in the same manner as in Example 3-1, except that the resin compositions prepared herein were used. These sheets were thermoformed into cups and the cups were evaluated, also in the same manner as in Example 3-1. The results obtained are shown in Table 7.

Example 3-6

A resin composition was produced in the same manner as in Example 3-1, except that 1 part by weight of calcium stearate (manufactured by Nippon Oils & Fats Co.) was added to 4 parts by weight of the blend of polyamide (B-1) and ionomer (C-2) (blending ratio: 25/75 by weight) used in Example 3-1.

Seven-layered sheets having the same constitution as in Example 3-1 were produced in the same manner as in Example 3-1, except that the resin composition prepared herein was used. The sheets were thermoformed into cups and the cups were evaluated, also in the same manner as in Example 3-1. The results obtained are shown in Table 7.

Example 3-7

A resin composition was produced in the same manner as in Example 3-1 and Example 3-6, except that hydrotalcite (DHT-4A, manufactured by Kyowa Chemical Co.) was used in place of calcium stearate used in Example 3-6.

Seven-layered sheets having the same constitution as in Example 3-1 were produced in the same manner as in Example 3-1, except that the resin composition prepared herein was used. The sheets were thermoformed into cups and the cups were evaluated, also in the same manner as in Example 3-1. The results obtained are shown in Table 7.

Example 3-8

A resin composition was produced in the same manner as in Example 3-1, except that all the four components were pelletized through one kneading operation where they were kneaded once all at a time without pre-kneading polyamide (B-1) and ionomer (C-2).

Seven-layered sheets having the same constitution as in Example 3-1 were produced in the same manner as in Example 3-1, except that the resin composition prepared herein was used. The sheets were thermoformed into cups and the cups were evaluated, also in the same manner as in Example 3-1. The results obtained are shown in Table 7.

Example 3-9

A four-component resin composition (REG) was prepared in the same manner as in Example 3-1, except for the following points: Precisely, polystyrene (PS; D-5) was used herein in place of polypropylene (D-4), and a three-layered sheet having outer polystyrene (D-5) layers on the both surfaces of an EVOH (A-2) layer (490/100/490 $\mu$) was formed through co-extrusion. The sheet: was ground into scrap, and the scrap thus prepared was used herein.

The four-component resin composition pellets obtained herein, EVOH (A-2), polystyrene (D-5) and adhesive resin (maleic anhydride-modified ethylene-vinyl acetate copolymer) were put into separate extruders, and co-extruded, using a 4-type/7-layer co-extrusion apparatus, into a 7-layered sheet (overall thickness: 1000 $\mu$) having a constitution of PS/REG/adhesive resin/EVOH/adhesive resin/REG/PS (300/150/25/50/25/150/300 $\mu$). Precisely, PS was extruded through a single-screw (65 mm$\phi$) extruder at 240° C.; REG through a single-screw (40 mm$\phi$) extruder at 220° C.; the adhesive resin through a single-screw (40 mm$\phi$) extruder at 220° C.; and EVOH through a single-screw (40 mm$\phi$) extruder at 210° C.

Using a thermoforming machine (manufactured by Asano Seisaku-sho Co.), the sheets obtained in 24 hours and 72 hours after the start of extrusion were thermoformed into cups (size of mold: 70$\phi$×70 mm). The thermoforming condition was as follows: The pressure of compression air introduced was 5 kg/cm2; the plug was of syntactic foam and its size was 45$\phi$×65 mm; the sheet temperature was 130° C.; the plug temperature was 20° C., and the mold temperature was 70° C.

The cups were evaluated, and the results are shown in Table 8.

Examples 3-10 to 3-12, and Comparative Examples 3-6 to 3-9

Various resin compositions were produced in the same manner as in Example 3-9, except that resin pellets shown in Table 8 were used in place of the four-component resin pellets in Example 3-9. Precisely, the resins and their ratios were varied as in Table 8 to prepare resin pellets herein. To prepare two-component and three-component resin compositions, the constituent resins were blended in one kneading operation.

Seven-layered sheets having the same constitution as in Example 3-9 were produced in the same manner as in Example 3-9, except that the resin compositions prepared herein were used. These sheets were thermoformed into cups and the cups were evaluated, also in the same manner as in Example 3-9. The results obtained are shown in Table 8.

Comparative Example 3-10

A four-component resin composition (REG) was prepared in the same manner as in Example 3-1, except for the following points: Precisely, polyethylene terephthalate (PET; D-7) was used herein in place of polypropylene (D-4), and a three-layered sheet having outer polyethylene terephthalate (D-7) layers on the both surfaces of an EVOH (A-2) layer (370/100/370 $\mu$) was formed through co-extrusion. The sheet was ground into scrap, and the scrap thus prepared was used herein.

The four-component resin composition pellets obtained herein, EVOH (A-2), polyethylene terephthalate (D-7) and adhesive resin (maleic anhydride-modified ethylene-vinyl acetate copolymer) were put into separate extruders, and co-extruded, using a 4-type/7-layer co-extrusion apparatus, into a 7-layered sheet (overall thickness: 1000 $\mu$) having a constitution of PET/REG/adhesive resin/EVOH/adhesive resin/REG/PET (300/150/25/50/25/150/300 $\mu$). Precisely, PET was extruded through a single-screw (65 mm$\phi$) extruder at 270° C.; REG through a single-screw (40 mm$\phi$) extruder at 220° C.; the adhesive resin through a single-screw (40 mm$\phi$) extruder at 270° C.; and EVOH through a single-screw (40 mm$\phi$) extruder at 210° C.

Using a thermoforming machine (manufactured by Asano Seisaku-sho Co.), the sheets obtained in 24 hours and 72 hours after the start of extrusion were thermoformed into cups (size of mold: 70$\phi$×70 mm). The thermoforming condition was as follows: The pressure of compression air introduced was 5 kg/cm2; the plug was of syntactic foam and its size was 45$\phi$×65 mm; the sheet temperature was 110° C.; the plug temperature was 20° C., and the mold temperature was 70° C.

The cups were evaluated, and the results are shown in Table 8.

Comparative Example 3-11

A resin composition was produced in the same manner as in Example 3-10, except that resin pellets shown in Table 8 were used in place of the four-component resin pellets in Example 3-10. Precisely, the resins and their ratios were varied as in Table 8 to prepare resin pellets herein. To prepare the resin composition, the constituent resins were blended in one kneading operation.

Seven-layered sheets having the same constitution as in Example 3-10 were produced in the same manner as in Example 3-10, except that the resin composition prepared herein was used. These sheets were thermoformed into cups and the cups were evaluated, also in the same manner as in Example 3-10. The results obtained are shown in Table 8.

TABLE 7

| | \multicolumn{9}{c}{Resin Composition} | | | | | | | | |
|---|---|---|---|---|---|---|---|---|---|
| | A wt. pts. | B wt. pts. | C wt. pts. | D wt. pts. | Additive wt. pts. | W(A)/W(A + D) | W/(B + C)/W(T) | W(B) /W(B + C) | Matrix Component |
| Example 3-1 | A-2 10 | B-1 1 | C-2 3 | D-4 86 | — | 0.10 | 0.04 | 0.25 | D-4 |
| Example 3-2 | A-2 10 | B-1 3 | C-2 1 | D-4 86 | — | 0.10 | 0.04 | 0.75 | D-4 |
| Example 3-3 | A-2 15 | B-1 2 | C-2 3 | D-4 80 | — | 0.16 | 0.05 | 0.40 | D-4 |
| Example 3-4 | A-3 20 | B-1 3 | C-2 3 | D-4 74 | — | 0.21 | 0.06 | 0.50 | D-4 |
| Example 3-5 | A-3 10 | B-2 1 | C-1 3 | D-4 86 | — | 0.10 | 0.04 | 0.25 | D-4 |
| Example 3-6 | A-3 10 | B-2 1 | C-1 3 | D-4 86 | St-Ca 1 | 0.10 | 0.04 | 0.25 | D-4 |
| Example 3-7 | A-3 10 | B-2 1 | C-1 3 | D-4 86 | DHT-4A | 0.10 | 0.04 | 0.25 | D-4 |
| Example 3-8 | A-2 10 | B-1 1 | C-2 3 | D-4 86 | — | 0.10 | 0.04 | 0.25 | D-4 |
| Comparative Example 3-1 | A-2 10 | — | — | D-4 90 | — | 0.10 | 0.00 | — | D-4 |
| Comparative Example 3-2 | A-2 10 | — | C-2 3 | D-4 87 | — | 0.10 | 0.03 | — | D-4 |
| Comparative Example 3-3 | A-2 10 | B-1 1 | — | D-4 89 | — | 0.10 | 0.01 | — | D-4 |
| Comparative Example 3-4 | A-2 10 | B-1 4 | — | D-4 86 | — | 0.10 | 0.04 | — | D-4 |
| Comparative Example 3-5 | A-2 10 | B-1 1 | C-3 3 | D-4 86 | — | 0.10 | 0.04 | 0.05 | D-4 |
| Comparative Example 3-6 | A-2 15 | — | C-4 5 | D-4 80 | — | 0.16 | 0.05 | — | D-4 |

| | \multicolumn{5}{c}{Appearance of Shaped Articles} | |
|---|---|---|---|---|---|
| | \multicolumn{2}{c}{24 hours after start of sheet molding} | \multicolumn{2}{c}{72 hours after start of sheet molding} | | |
| | Sheets | Cups | Sheets | Cups | Remarks |
| Example 3-1 | A | A | A | A | |
| Example 3-2 | A | B | B | C | |
| Example 3-3 | A | B | A | B | |
| Example 3-4 | B | B | B | B | |
| Example 3-5 | A | A | B | B | |
| Example 3-6 | A | A | A | A | |
| Example 3-7 | A | A | A | A | |
| Example 3-8 | B | B | B | C | Kneaded once all at a time. |
| Comparative Example 3-1 | D | D | D | D | |
| Comparative Example 3-2 | D | D | D | D | |
| Comparative Example 3-3 | D | D | D | D | |
| Comparative Example 3-4 | D | D | D | D | |
| Comparative Example 3-5 | B | C | C | D | |
| Comparative Example 3-6 | B | C | B | C | |

TABLE 8

| | \multicolumn{9}{c}{Resin Composition} | | | | | | | | |
|---|---|---|---|---|---|---|---|---|---|
| | A wt. pts. | B wt. pts. | C wt. pts. | D wt. pts. | Additive wt. pts. | W(A)/W(A + D) | W/(B + C)/W(T) | W(B) /W(B + C) | Matrix Component |
| Example 3-9 | A-2 10 | B-1 1 | C-2 3 | D-5 86 | — | 0.10 | 0.04 | 0.25 | D-5 |
| Example 3-10 | A-2 10 | B-1 3 | C-2 1 | D-5 86 | — | 0.10 | 0.04 | 0.75 | D-5 |
| Example 3-11 | A-2 15 | B-2 2 | C-1 3 | D-5 80 | — | 0.16 | 0.05 | 0.40 | D-5 |

TABLE 8-continued

| | | | | | | | | | |
|---|---|---|---|---|---|---|---|---|---|
| Example 3-12 | A-3 8 | B-2 1 | C-1 2 | D-5 89 | — | 0.08 | 0.04 | 0.33 | D-5 |
| Comparative Example 3-6 | A-2 10 | — | — | D-5 90 | — | 0.10 | 0.03 | — | D-5 |
| Comparative Example 3-6 | A-2 10 | — | C-2 4 | D-5 86 | — | 0.10 | 0.00 | — | D-5 |
| Comparative Example 3-8 | A-2 10 | B-1 4 | — | D-5 86 | — | 0.10 | 0.04 | — | D-5 |
| Comparative Example 3-9 | A-2 10 | B-1 1 | C-3 3 | D-5 86 | — | 0.10 | 0.04 | 0.25 | D-5 |
| Comparative Example 3-10 | A-2 10 | B-1 1 | C-2 3 | D-7 86 | — | 0.10 | 0.04 | 0.25 | D-7 |
| Comparative Example 3-11 | A-2 10 | — | — | D-7 90 | — | 0.10 | 0.00 | — | D-7 |

| | Appearance of Shaped Articles | | | |
|---|---|---|---|---|
| | 24 hours after start of sheet molding | | 72 hours after start of sheet molding | |
| | Sheets | Cups | Sheets | Cups |
| Example 3-9 | A | A | A | A |
| Example 3-10 | A | B | B | B |
| Example 3-11 | A | B | A | B |
| Example 3-12 | A | A | A | B |
| Comparative Example 3-6 | D | D | D | D |
| Comparative Example 3-7 | D | D | D | D |
| Comparative Example 3-8 | D | D | D | D |
| Comparative Example 3-9 | C | D | D | D |
| Comparative Example 3-10 | D | D | D | D |
| Comparative Example 3-11 | D | D | D | D |

EXAMPLES OF FLEXIBLE FILM

Example 4-1

Of the resins shown in Tables 1 to 4, a blend comprised of 90 parts by weight of EVOH (A-2), 1 part by weight of polyamide (B-1), 1 part by weight of ionomer (C-2) and 8 parts by weight of very-low-density polyethylene (D-6) was prepared according to the method mentioned below. Precisely, polyamide (B-1) and ionomer (C-2) were fed into a vent-type, twin-screw extruder, and pelletized through it at 220° C. in the presence of nitrogen. The resulting blend pellets were further blended with EVOH (A-2) and very-low-density polyethylene (D-6), in the same manner as above, to obtain the intended resin composition pellets.

Using a fullflight-type screw extruder (40 mmϕ, L/D=24, compression ratio=3.5), the thus-obtained pellets were extruded through a flat die having a width of 550 mm into a single-layered film having a thickness of 25 μ. Observing the film thus obtained herein with an electronic microscope verified that EVOH (A-2) formed a matrix phase and the very-low-density polyethylene (D-6) formed a dispersed phase in the film. According to the methods mentioned below, the film was tested for the haze, the bending resistance, the Young's modulus, the film impact, the oxygen transmission rate (OTR), and, if any, gels and fish eyes. The results obtained are shown in Table 9.

(1) Haze:
The haze of a film sample having a thickness of 25 μ was measured, using a Poic integrating-sphere light transmittance meter (manufactured by Nippon Seimitsu Kogaku KK).

(2) Bending Resistance:
The bending resistance of each film sample was measured, using a Gelbo Flex Tester (manufactured by Rigaku Kogyo KK). Precisely, a film sample having a size of 12 inches×8 inches was rounded into a cylindrical film having a diameter of 3.5 inches, and the both edges of the cylindrical film were fixed. The original distance between the both edges fixed was 7 inches. With its one edge being moved, the cylindrical film was subjected to reciprocating motion of 40 strokes/min in the following manner: In one stroke, the sample was twisted at 440 degrees in the first 3.5 inches, while it was linearly moved in the horizontal direction in the next 2.5 inches. The distance between the both edges at the greatest stroke was 1 inch. 100 strokes were repeated for one sample at 20° C. and 65% RH, and the number of pinholes, if any, formed in the sample after the test was counted.

In the same bending test, the number of strokes to give the first pinhole in the sample was counted.

(3) Young's Modulus:
The Young's modulus of each film sample was measured at 20° C. and 65% RH, according to ASTM D-882-67.

(4) Film Impact:
A disc film sample having a predetermined area was holded horizontally, and a stick having 0.6-inch semi-ball at its tip was vertically applied thereto, and the force to the stick at which the film was broken was read out. Prior to this test, the film sample was pre-conditioned at 20° C. and 65% RH for 2 weeks. The device used in this test was Film Impact Tester manufactured by Toyo Seiki KK.

(5) Oxygen Transmission Rate (OTR):

The oxygen transmission rate (OTR) through each film sample was measured at 20° C. and 65% RH, using OX-Tran10-50A (manufactured by Modern Control Co.).

(6) Gels and Fish Eyes:

Film samples produced in 24 hours after the start of film-forming extrusion were checked with the naked eye, and evaluated according to the following criteria A to D:

A: Neither gels nor fish eyes found.
B: Minor gels and fish eyes formed.
C: Small gels and fish eyes formed partly on the surface.
D: Small gels and fish eyes formed thoroughly on the surface.

Examples 4-2 to 4-6, and Comparative Examples 4-1 to 4-9

Various single-layered films were produced in the same manner as in Example 4-1, except that resin pellets shown in Table 9 were used in place of the four-component resin pellets in Example 4-1. Precisely, the resins and their ratios were varied as in Table 9. To prepare two-component and three-component resin compositions, the constituent resins were blended in one kneading operation. To prepare one-component resin compositions, the constituent resin was not kneaded. The results of evaluation of those films are shown in Table 9.

Example 4-7

Single-layered films were produced in the same manner as in Example 4-1, except that the four resin components were kneaded only once and all at a time, and pelletized. The results of evaluation of the films are shown in Table 9.

TABLE 9

| | Resin Composition | | | | | | | |
|---|---|---|---|---|---|---|---|---|
| | A wt. pts. | B wt. pts. | C wt. pts. | D wt. pts. | W(A)/W(A + D) | W(B + C)/W(T) | W(B)/W(B + C) | Component of Matrix Phase |
| Example 4-1 | A-2 90 | B-1 1 | C-2 1 | D-6 8 | 0.92 | 0.02 | 0.50 | A-2 |
| Example 4-2 | A-2 80 | B-1 2 | C-2 3 | D-6 15 | 0.84 | 0.05 | 0.40 | A-2 |
| Example 4-3 | A-2 70 | B-1 2 | C-2 3 | D-6 25 | 0.74 | 0.05 | 0.40 | A-2 |
| Example 4-4 | A-2 80 | B-1 4 | C-2 1 | D-6 15 | 0.84 | 0.05 | 0.80 | A-2 |
| Example 4-5 | A-2 80 | B-1 2 | C-2 3 | D-8 15 | 0.84 | 0.05 | 0.40 | A-2 |
| Example 4-6 | A-2 80 | B-1 2 | C-1 3 | D-6 15 | 0.84 | 0.05 | 0.40 | A-2 |
| Example 4-7 | A-2 80 | B-1 2 | C-2 3 | D-6 15 | 0.84 | 0.05 | 0.40 | A-2 |
| Comparative Example 4-1 | A-1 80 | — | — | D-6 20 | 0.80 | 0.00 | — | A-1 |
| Comparative Example 4-2 | A-2 80 | B-1 5 | — | D-6 15 | 0.84 | 0.05 | — | A-2 |
| Comparative Example 4-3 | A-2 80 | — | C-2 5 | D-6 15 | 0.84 | 0.05 | — | A-2 |
| Comparative Example 4-4 | A-2 80 | B-1 7 | C-2 13 | — | 1.00 | 0.20 | 0.25 | A-2 |
| Comparative Example 4-5 | A-1 100 | — | — | — | 1.00 | 0.00 | — | A-1 |
| Comparative Example 4-6 | A-2 80 | B-1 2 | C-3 3 | D-6 15 | 0.84 | 0.05 | 0.40 | A-2 |
| Comparative Example 4-7 | A-2 80 | B-1 2 | C-2 3 | D-1 15 | 0.84 | 0.05 | 0.40 | A-2 |
| Comparative Example 4-8 | A-2 80 | B-1 2 | C-2 3 | D-9 15 | 0.84 | 0.05 | 0.40 | A-2 |
| Comparative Example 4-9 | A-1 80 | — | — | D-9 20 | 0.80 | 0.00 | — | A-1 |

| | Quality Evaluation | | | | | | |
|---|---|---|---|---|---|---|---|
| | | Bending Resistance | | | | | |
| | Haze (%) | (number of pinholes formed) | (number of strokes before formation of pinholes) | Young's Modulus (kg/cm$^2$) | Film Impact (kg · cm) | OTR *1) | Gel Fish Eyes | Remarks |
| Example 4-1 | 10 | 0 | 100 | 165 | 2.5 | 2.6 | A |
| Example 4-2 | 12 | 0 | 180 | 140 | 3.2 | 2.9 | A |
| Example 4-3 | 15 | 0 | 250 | 110 | 3.8 | 3.3 | A |
| Example 4-4 | 13 | — | 170 | 140 | 2.6 | 2.8 | B |
| Example 4-5 | 12 | — | 210 | 100 | 3.3 | 3.0 | A |
| Example 4-6 | 13 | — | 190 | 120 | 2.8 | 3.1 | A |

TABLE 9-continued

| | | | | | | | | |
|---|---|---|---|---|---|---|---|---|
| Example 4-7 | 11 | — | 180 | 125 | 2.5 | 3.1 | A | Kneaded once all at a time. |
| Comparative Example 4-1 | 20 | 0 | 200 | 120 | 0.5 | 3.1 | B | |
| Comparative Example 4-2 | 19 | — | 150 | 145 | 0.8 | 2.8 | C | |
| Comparative Example 4-3 | 19 | — | 200 | 120 | 0.6 | 3.2 | B | |
| Comparative Example 4-4 | 5 | — | 120 | 160 | 1.9 | 2.8 | C | |
| Comparative Example 4-5 | 1 | 40 | 40 | 200 | 0.9 | 2.1 | A | |
| Comparative Example 4-6 | 15 | — | 150 | 150 | 1.9 | 3.1 | C | |
| Comparative Example 4-7 | 15 | — | 80 | 170 | 1.2 | 3.3 | A | |
| Comparative Example 4-8 | 12 | — | 200 | 100 | 0.7 | 3.2 | D | |
| Comparative Example 4-9 | 12 | — | 250 | 90 | 0.5 | 3.5 | D | |

EXAMPLES OF MAT FILM

Example 5-1

85% by weight of EVOH pellets having an ethylene content of 44 mol %, a degree of saponification of 99.4 mol % and a melt index of 5.1 g/10 min (measured at 190° C. and under a load of 2160 g), 10% by weight of high-density polyethylene resin having a melt index of 1.0 g/10 min (measured at 190° C. and under a load of 2160 g), 2% by weight of polyamide resin (PA-6, Toray's Amilan CN1010T), and 3% by weight of ethylene-methacrylic acid copolymer (having a methacrylic acid content of 3.1 mol %, and a melt index of 1.5 g/10 min as measured at 190° C. and under a load of 2160 g) were blended and pelletized, using a twin-screw extruder. The resulting pellets were formed into a film having a thickness of 20 μm, through a single-screw extruder equipped with a T-die. This film had a degree of surface gloss of 35%. Observing the film with an electronic microscope verified that EVOH formed a matrix phase and the high-density polyethylene formed a dispersed phase.

The outward appearance of the film having been produced in 8 hours after the start of film-forming extrusion was checked with the naked eye for gels and fish eyes, if any, and the film was evaluated according to the following criteria A to D:

A: Neither gels nor fish eyes found.
B: Minor gels and fish eyes formed.
C: Small gels and fish eyes formed partly on the surface.
D: Small gels and fish eyes formed thoroughly on the surface.

Examples 5-2 to 5-9, and Comparative Examples 5-1 to 5-7

Various films were produced in the same manner as in Example 5-1, except that the constituent resins and their amounts were varied. The degree of surface gloss of those films was measured, and the outward appearance thereof was checked. The resins and their amounts used herein are shown in Table 10 along with the test data obtained.

The following were used herein as the EVOH (A).

a-1
EVOH, having an ethylene content of 44 mol %, a degree of saponification of 99.4%, and a melt index of 5.1 g/10 min (190°C, 2160 g).

a-2
EVOH, having an ethylene content of 27 mol %, a degree of saponification of 99.4%, and a melt index of 1.5 g/10 min (190° C., 2160 g).

The following were used as the polyamide (B):
b-1
6-Polyamide (Toray's Amilan CN1010T).
b-2
6/12-Copolyamide (UBE Nylon 7024B).

The following were used as the ethylene-unsaturated carboxylic acid random copolymer or its metal salt (C).
c-1
Ethylene-methacrylic acid random copolymer, having a methacrylic acid content of 3.1 mol %, and a melt index of 1.5 g/10 min (190° C., 2160 g).

c-2
Metal salt (ionomer) of ethylene-methacrylic acid random copolymer, having a methacrylic acid content of 5.3 mol %, a degree of neutralization of 60% with a counter ion of Zn, and a melt index of 0.7 g/10 min (190° C., 2160 g).

c-3
Metal salt (ionomer) of ethylene-methacrylic acid random copolymer, having a methacrylic acid content of 6.7 mol %, a degree of neutralization of 36% with a counter ion of Na, and a melt index of 2.1 g/10 min (190° C., 2160 g).

The following were used as the thermoplastic resin (D).
d-1
High-density polyethylene, having a melt index of 1.0 g/10 min (190° C., 2160 g).

d-2
Low-density polyethylene, having a melt index of 2.5 g/10 min (190° C., 2160g ).

d-3
Maleic anhydride-modified high-density polyethylene, having a degree of modification of 0.09 mol %, and a melt index of 1.0 g/10 min (190° C., 2160 g).

TABLE 10

| | A wt. pts. | B wt. pts. | C wt. pts. | D wt. pts. | Additive wt. pts. | W(A) /W(A + D) | W(B + C) /W(T) | W(B) /W(B + C) | Matrix Component | Surface Gloss (%) | Gel Fish Eyes |
|---|---|---|---|---|---|---|---|---|---|---|---|
| Example 5-1 | a-1 85 | b-1 2 | c-1 3 | d-1 10 | — | 0.89 | 0.05 | 0.29 | a-1 | 36 | A |
| Example 5-2 | a-1 65 | b-1 7 | c-2 8 | d-1 20 | — | 0.76 | 0.15 | 0.47 | a-1 | 11 | B |
| Example 5-3 | a-1 75 | b-1 4 | c-2 6 | d-1 15 | — | 0.83 | 0.10 | 0.40 | a-1 | 19 | A |
| Example 5-4 | a-1 75 | b-2 4 | c-2 6 | d-1 15 | — | 0.83 | 0.10 | 0.40 | a-1 | 24 | A |
| Example 5-5 | a-1 75 | b-1 4 | c-2 6 | d-2 15 | — | 0.83 | 0.10 | 0.40 | a-1 | 16 | A |
| Example 5-6 | a-2 75 | b-1 4 | c-2 6 | d-1 15 | — | 0.83 | 0.10 | 0.40 | a-2 | 20 | A |
| Example 5-7 | a-2 75 | b-1 4 | c-3 6 | d-2 15 | — | 0.83 | 0.10 | 0.40 | a-2 | 27 | A |
| Example 5-6 | a-2 75 | b-2 4 | c-1 6 | d-2 15 | — | 0.83 | 0.10 | 0.40 | a-2 | 30 | A |
| Example 5-9 | a-1 75 | b-1 4 | c-1 6 | d-3 15 | — | 0.83 | 0.1 | 0.40 | a-1 | 16 | A |
| Comp. Ex. 5-1 | a-1 75 | — | — | d-1 25 | — | 0.75 | 0 | — | a-1 | 70 | A |
| Comp. Ex. 5-2 | a-1 75 | b-1 10 | — | d-1 15 | — | 0.83 | 0.1 | — | a-1 | 78 | C |
| Comp. Ex. 5-3 | a-1 75 | — | c-2 10 | d-1 15 | — | 0.83 | 0.1 | — | a-1 | 75 | A |
| Comp. Ex. 5-4 | a-1 75 | b-1 12 | c-2 13 | — | — | 1.00 | 0.25 | 0.78 | a-1 | 90 | D |
| Comp. Ex. 5-5 | a-1 75 | — | — | d-3 25 | — | 1.00 | 0.00 | — | a-1 | 25 | D |
| Comp. Ex. 5-6 | a-1 75 | b-1 8 | c-2 2 | d-1 15 | — | 0.75 | 0.10 | 0.80 | a-1 | 25 | D |
| Comp. Ex. 5-7 | a-1 80 | — | — | — | silica 20 | 1.00 | 0.00 | — | a-1 | *i) | — |

*1) Films could not be formed as being in holes.

Example 5-10

To prepare a model of polyvinyl chloride wallpaper, 100 parts by weight of polyvinyl chloride (P=1400), 45 parts by weight of dioctyl phthalate, 5 parts by weight of tricresyl phosphate, 1 part by weight of epoxy resin stabilizer (trade name: EP-828), 1 part by weight of liquid, barium-zinc composite stabilizer, 0.2 parts by weight of barium stearate, 0.4 parts by weight of zinc stearate, and 1.5 parts by weight of sorbitan monostearate, were stirred and mixed in a super mixer for 10 minutes, then kneaded with mixing rolls heated at 165° C., and sheeted into a polyvinyl chloride film having a thickness of 0.1 mm. This film was laminated with a film of the EVOH composition that had been produced in Example 5-1, using an urethane adhesive AD-335A and a curing agent Cat-10 (manufactured by Toyo Moton Co.; mixing ratio=17/1). The resulting laminate was tested for the stain resistance, the bleeding resistance and the surface gloss. The results obtained are shown in Table 11.

The stain resistance of the EVOH film laminated was evaluated as follows: Using writing materials of an aqueous ink marker (Sakura's Sign Pen), an oily ink marker (Zebra's Mackie Gokuboso for drawing ultra-thin lines), a lipstick (Shiseido's Lechente Rouge Excellent RD524), and a crayon (Sakura's Crayon Futomaki Red for drawing thick lines), lines were drawn on the EVOH film surface of each laminate sample. The thus-stained samples were wiped with neutral detergent (Lion's Mamalemon). In addition, the samples stained with the oily ink marker were wiped with a thinner for household use. The thus-wiped samples were checked for the degree of coloration in the stained area, while being compared with a JIS gray scale. The bleeding resistance of the laminate samples was evaluated as follows: Two laminate samples were put together with their EVOH film surfaces facing each other, and kept at 70° C. under a load of 100 g/cm for 24 hours. After having been thus left, the EVOH film surfaces were checked with the naked eye for their condition.

Comparative Example 5-8

The polyvinyl chloride film of Example 5-10 not laminated with the EVOH film was tested and evaluated in the same manner as in Example 5-10. The results are shown in Table 11.

TABLE 11

| | Staining Substance | Cleaning Reagent | Example 5-10 | Comparative Example 5-8 |
|---|---|---|---|---|
| Stain Resistance | Aqueous Ink | Neutral Detergent | 5 | 4 |
| | Crayon | Neutral Detergent | 5 | 4 |
| | Lipstick | Neutral Detergent | 4 to 5 | 3 |
| | Oily Ink | Neutral Detergent | 4 | 1 |
| | Oily Ink | Thinner | 5 | Substrate dissolved. |

TABLE 11-continued

| | Staining Substance | Cleaning Reagent | Example 5-10 | Comparative Example 5-8 |
|---|---|---|---|---|
| Bleeding Resistance | | | No change in appearance. | Sealed, and peeling impossible. |
| Degree of Surface Gloss (%) | | | 36 | 73 |

Comparing Example 5-10 and Comparative Example 5-8, it is obvious that the surface gloss of the laminate film of the former is much lower than that of the non-laminated film of the latter. In addition, it is known that the stain resistance and the bleeding resistance of the laminate film of Example 5-10 are much better than those of the non-laminate film of Comparative Example 5-8.

Industrial Applicability

The invention provides a resin composition comprising (A) an ethylene-vinyl alcohol copolymer, (B) a polyamide resin, (C) an ethylene-unsaturated carboxylic acid random copolymer or its metal salt, and (D) a thermoplastic resin except the resins noted above, of which the solubility parameter (as calculated from the Fedors' formula) is not more than 11, and having excellent compatibility. The resin composition has excellent barrier properties, mechanical strength, flexibility, drawability, melt stability, scrap recyclability, heat sealability, coatability, stain resistance and transparency, and has many applications in various fields.

What is claimed is:

1. A resin composition comprising (A) an ethylene-vinyl alcohol copolymer, (B) a polyamide resin, (C) an ethylene-unsaturated carboxylic acid random copolymer or its metal salt, and (D) a thermoplastic resin except the resins noted above, of which the solubility parameter (as calculated from the Fedors' formula) is not more than 11, wherein;

the compositional ratio by weight satisfies the following formulae (1) to (4):

$$0.6 \leq W(A+D)/W(T) \leq 0.995 \quad (1)$$
$$0.005 \leq W(B+C)/W(T) \leq 0.4 \quad (2)$$
$$0.01 \leq W(A)/W(A+D) \leq 0.99 \quad (3)$$
$$0.02 \leq W(B)/W(B+C) \leq 0.98 \quad (4)$$

wherein;
W(A) indicates the weight of (A) in the composition,
W(B) indicates the weight of (B) in the composition,
W(C) indicates the weight of (C) in the composition,
W(D) indicates the weight of (D) in the composition,
W(T) indicates the total weight of the composition.

2. The resin composition as claimed in claim 1, which contains from 0.01 to 3 parts by weight, based on the total weight of the composition, of at least one selected from the group consisting of metal salts of higher aliphatic carboxylic acids and hydrotalcite compounds.

3. The resin composition as claimed in claim 1, wherein the compositional ratio by weight of W(B)/W(B+C) is not more than 0.5.

4. The resin composition as claimed in claim 1, wherein the thermoplastic resin (D) forms a matrix phase and the ethylene-vinyl alcohol copolymer (A) forms a dispersed phase.

5. The resin composition as claimed in claim 1, wherein the ethylene-vinyl alcohol copolymer (A) forms a matrix phase and the thermoplastic resin (D) forms a dispersed phase.

6. The resin composition as claimed in claim 5, wherein the thermoplastic resin (D) has a modulus of elasticity at 20° C. of not more than 500 kg/cm$^2$.

7. A method for producing the resin composition of claim 1, which comprises mixing a polyamide resin (B) and an ethylene-unsaturated carboxylic acid random copolymer or its metal salt (C) both in melt followed by mixing the resulting melt mixture with an ethylene-vinyl alcohol copolymer (A) and a thermoplastic resin (D) all in melt.

8. A multilayered structure comprising at least one layer of the resin composition of claim 1.

9. A head of a tube container comprising the resin composition of claim 4.

10. A shaped article comprising the resin composition of claim 4, of which the surface is painted.

11. A thermoformed container having a layer of the resin composition of claim 4.

12. A flexible film comprising the resin composition of claim 5.

13. A mat film comprising the resin composition of claim 5, of which at least one surface has a degree of surface gloss of not more than 60%.

14. A scrap recycling method of using (B) a polyamide resin and (C) an ethylene-unsaturated carboxylic acid random copolymer or its metal salt as the compatibilizer for recycling the scrap of shaped articles that comprise, as the major components, (A) an ethylene-vinyl alcohol copolymer and (D) a thermoplastic resin except the resins noted above, of which the solubility parameter (as calculated from the Fedors' formula) is not more than 11.

15. The scrap recycling method as claimed in claim 14, wherein the compatibilizer contains at least one selected from the group consisting of metal salts of higher aliphatic carboxylic acids and hydrotalcite compounds.

16. A multilayered structure comprising at least one scrap-recycled layer of the resin composition as recycled according to the method of claim 14.

17. The resin composition as claimed in claim 1, wherein said ethylene-vinyl alcohol copolymer (A) has an ethylene content of from 15–70 mol %.

18. The resin composition as claimed in claim 5, wherein the thermoplastic resin (D) has a modulus of elasticity at 20° C. of not more than 400 kg/cm$^2$.

19. The resin composition according to claim 1, wherein said ethylene-vinyl alcohol copolymer (A) has a melt index at 190° C. under a load of 2160 g of from 0.1–50 g/10 min.; said polyamide resin (B) has a melt index at 210° C. under a load of 2160 g of from 0.1–50 g/10 min.; said ethylene-unsaturated carboxylic acid random copolymer (C) or its metal salt has a melt index at 190° C. under a load of 2160 g of from 0.05–50 g/10 min.; and said thermoplastic resin (D) has a melt index at 190° C. under a load of 2160 g of from 0.05–100 g/10 min.

20. The resin composition according to claim 1, wherein the compositional ratio by weight satisfies the following formulae (1) to (4):

$$0.65 \leq W(A+D)/W(T) \leq 0.99 \quad (1)$$

$$0.01 \leq W(B+C)/W(T) \leq 0.35 \quad (2)$$

$$0.02 \leq W(A)/W(A+D) \leq 0.98 \quad (3)$$

$$0.04 \leq W(B)/W(B+C) \leq 0.96 \quad (4).$$

21. The resin composition according to claim 1, wherein the compositional ratio by weight satisfies the following formulae (1) to (4):

$$0.70 \leq W(A+D)/W(T) \leq 0.985 \quad (1)$$

$$0.015 \leq W(B+C)/W(T) \leq 0.30 \quad (2)$$

$$0.03 \leq W(A)/W(A+D) \leq 0.97 \quad (3)$$

$$0.05 \leq W(B)/W(B+C) \leq 0.95 \quad (4).$$

* * * * *